(12) United States Patent
Nozawa et al.

(10) Patent No.: US 6,865,026 B2
(45) Date of Patent: Mar. 8, 2005

(54) ZOOM LENS, AND ELECTRONIC IMAGING SYSTEM USING THE SAME

(75) Inventors: Toshihide Nozawa, Hachioji (JP); Kyoko Iijima, Hachioji (JP)

(73) Assignee: Olympus Corporation, Tokyo (JP)

( * ) Notice: Subject to any disclaimer, the term of this patent is extended or adjusted under 35 U.S.C. 154(b) by 112 days.

(21) Appl. No.: 10/410,200

(22) Filed: Apr. 10, 2003

(65) Prior Publication Data

US 2003/0197952 A1 Oct. 23, 2003

(30) Foreign Application Priority Data

Apr. 10, 2002 (JP) ........................................ 2002-107711

(51) Int. Cl.$^7$ ........................ G02B 15/14; G02B 17/00; G03B 17/00

(52) U.S. Cl. ..................... 359/689; 348/240.3; 359/726; 396/72

(58) Field of Search ................................ 359/683, 686, 359/689, 726; 348/240.3; 396/72

(56) References Cited

U.S. PATENT DOCUMENTS

| | | | | |
|---|---|---|---|---|
| 3,649,101 | A | 3/1972 | Straw et al. | 350/184 |
| 4,810,072 | A | 3/1989 | Takahashi | 350/427 |
| 5,570,229 | A | 10/1996 | Kanamori | 359/431 |
| 5,668,668 | A | 9/1997 | Shibayama et al. | 359/683 |
| 6,016,228 | A | 1/2000 | Uzawa | 359/687 |
| 6,088,169 | A | 7/2000 | Ohno | 359/682 |
| 6,124,987 | A | 9/2000 | Kayanuma et al. | 359/692 |
| 6,185,048 | B1 | 2/2001 | Ishii et al. | 359/687 |
| 6,308,011 | B1 | 10/2001 | Wachi et al. | 396/72 |
| 6,339,508 | B1 | 1/2002 | Nozawa et al. | 359/686 |
| 6,754,446 | B2 * | 6/2004 | Hagimori et al. | 396/72 |
| 2003/0161620 | A1 * | 8/2003 | Hagimori et al. | 396/72 |
| 2004/0105020 | A1 * | 6/2004 | Iwasawa | 348/240.3 |

FOREIGN PATENT DOCUMENTS

| | | |
|---|---|---|
| EP | 0 773 460 | 5/1997 |
| EP | 0 906 587 | 9/2002 |
| JP | 63-292106 | 11/1988 |
| JP | 03-139607 | 6/1991 |
| JP | 03-158817 | 7/1991 |
| JP | 08-070400 | 3/1996 |
| JP | 08-130702 | 5/1996 |
| JP | 09-211287 | 8/1997 |
| JP | 10-20191 | 1/1998 |
| JP | 11-194274 | 7/1999 |
| JP | 2000-137164 | 5/2000 |

OTHER PUBLICATIONS

Patent Abstracts of Japan, vol. 1997, No. 12, Dec. 12, 1997 & JP 09 211287, Aug. 15, 1997.
Shashin Kogyo (Photographic Industry), Mar. 2002, pp. 104–105.

* cited by examiner

Primary Examiner—Scott J. Sugarman
(74) Attorney, Agent, or Firm—Kenyon & Kenyon

(57) ABSTRACT

The invention relates to a zoom lens with an easily bendable optical path, which comprises a reduced number of lens element while having high optical specification. The zoom lens comprises a moving lens group B (G2) that has positive refracting power and moves only toward an object side of the zoom lens upon zooming from a wide-angle end to a telephoto end of the zoom lens, a lens group A (G1) that is located on the object side with respect to the moving lens group B, has negative refracting power and remains fixed during the zooming, and a third lens group C (G3) that is located on an image side of the zoom lens with respect to the moving lens group B and moves in a locus different from that of the moving lens group B during the zooming. The lens group A that remains fixed during zooming comprises, in order from an object side thereof, a negative lens element, a reflective optical element and a positive lens element having an absolute value of refracting power smaller than that of the negative lens element.

23 Claims, 14 Drawing Sheets

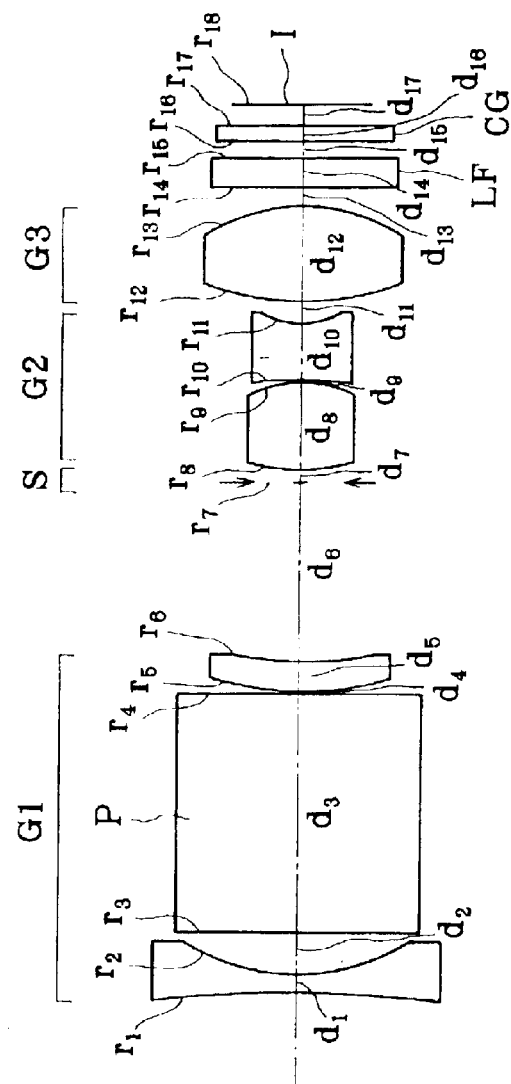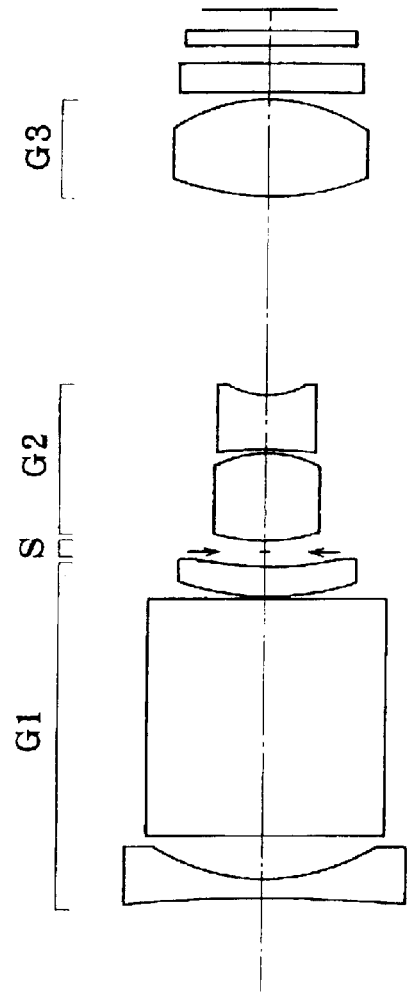
FIG. 1(a)
FIG. 1(b)

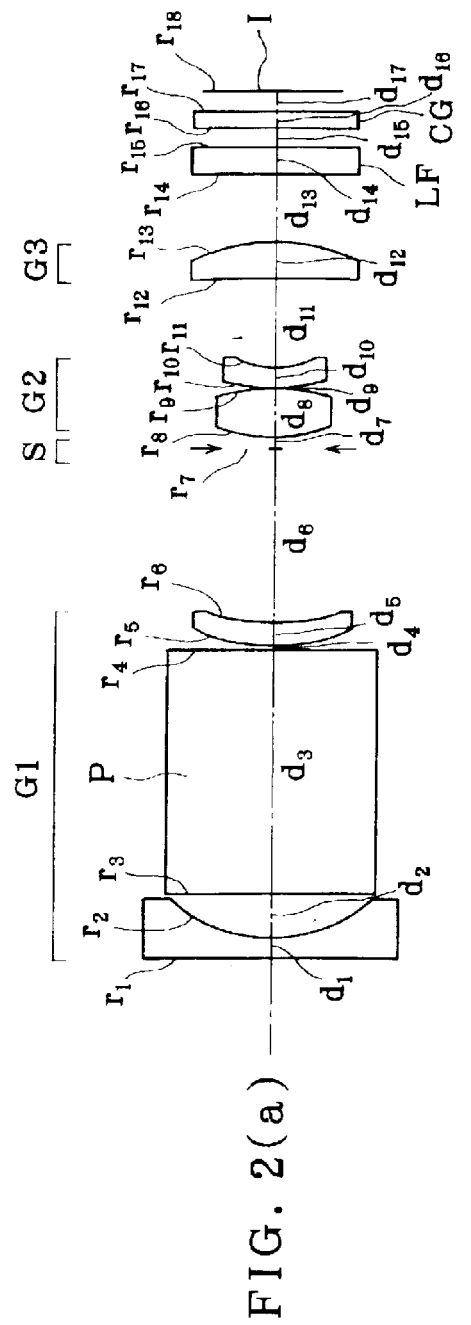
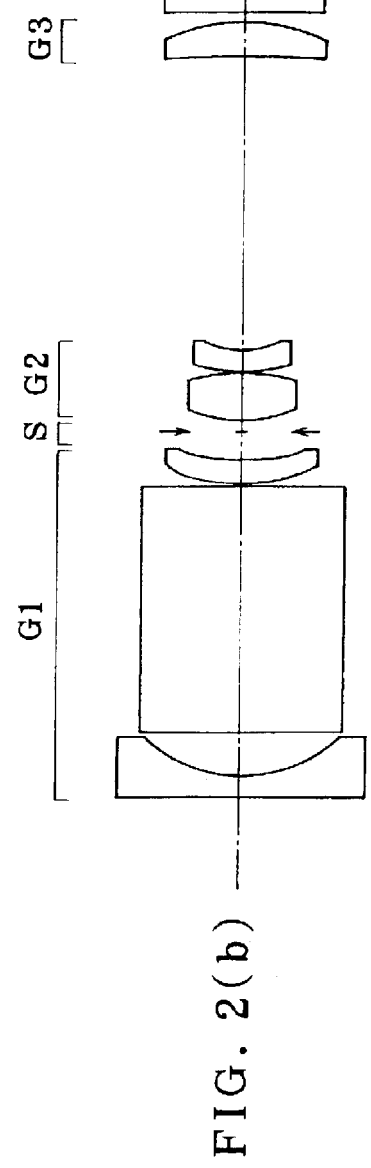
FIG. 2(a)
FIG. 2(b)

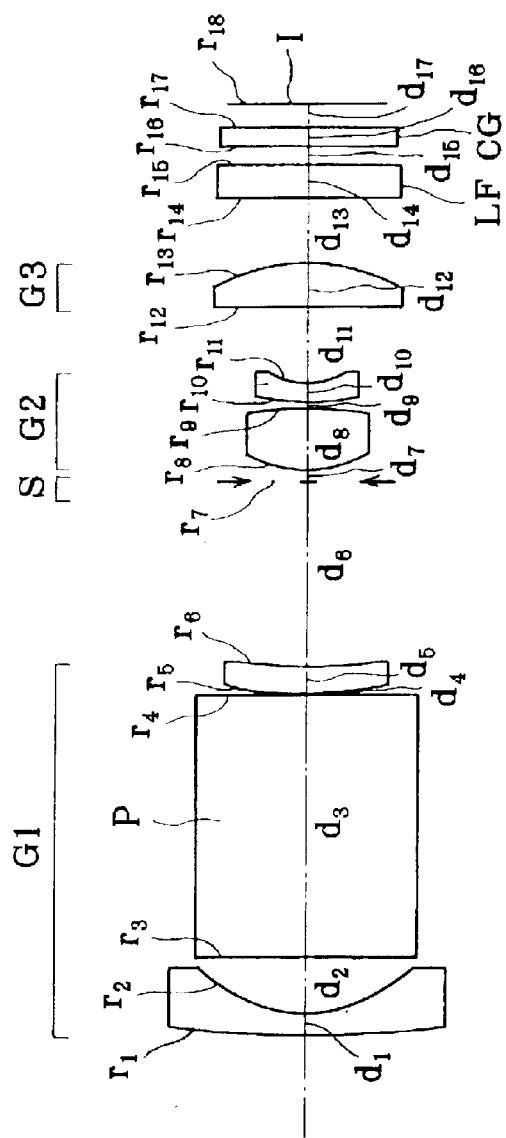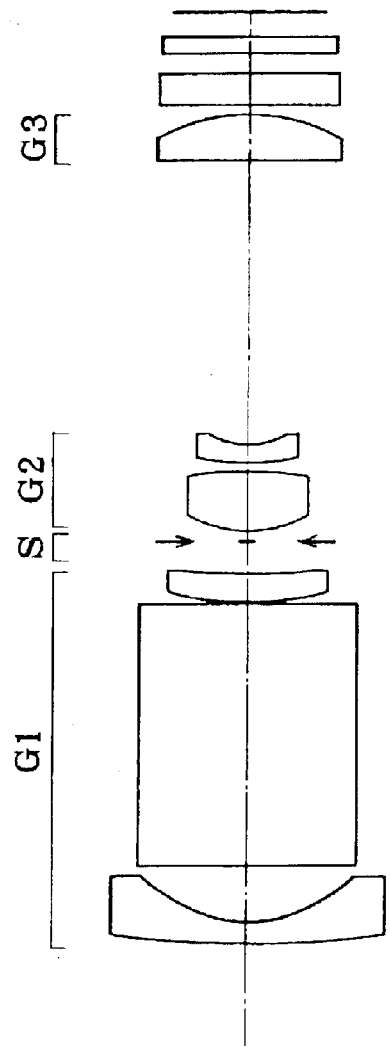
FIG. 3(a)
FIG. 3(b)

C: Cyan   M: Magenta
Ye: Yellow   G: Green

ZOOM LENS, AND ELECTRONIC IMAGING SYSTEM USING THE SAME This application claims benefits of Japanese Application No. 2002-107711 filed in Japan on Apr. 10, 2002, the contents of which are incorporated herein by this reference.

BACKGROUND OF THE INVENTION

The present invention relates generally to a zoom lens and an electronic imaging system using the same, and more particularly to an electronic imaging system such as a video camera or a digital camera, the depth dimension of which is diminished by providing some contrivances to an optical system portion such as a zoom lens.

In recent years, digital cameras (electronic cameras) have received attention as the coming generation of cameras, an alternative to silver-halide 35 mm-film (usually called Leica format) cameras. Currently available digital cameras are broken down into some categories in a wide range from the high-end type for commercial use to the portable low-end type.

In view of the category of the portable low-end type in particular, the primary object of the present invention is to provide the technology for implementing video or digital cameras whose depth dimension is reduced while high image quality is ensured, and which are easy to handle. The gravest bottleneck in diminishing the depth dimension of cameras is the thickness of an optical system, especially a zoom lens system from the surface located nearest to its object side to an image pickup plane.

Recent technologies for slimming down cameras rely primarily on a collapsible lens mount that allows the optical system to be taken out of a camera body for phototaking and received therein for carrying. Typical examples of an optical system that may effectively be slimmed down while relying on the collapsible lens mount are disclosed in JP-A's 11-194274, 11-287953 and 2000-9997. Each publication discloses an optical system comprising, in order from its object side, a first lens group having negative refracting power and a second lens group having positive refracting power, wherein both lens groups move during zooming.

The application of collapsible lens mounts to such optical systems is not preferable in view of operability because much time is taken to put them from the lens mounts to the ready state. The location of a movable lens group nearest to the object side of the optical system is also not preferable for water-proofing and dust-proofing purposes.

SUMMARY OF THE INVENTION

In view of such problems with the prior art as described above, the primary object of the present invention is to provide a zoom lens in which an optical path (optical axis) through an optical system can easily be bent with a reflective optical element such as a mirror, and which, albeit being composed of a reduced number of lens elements, has high optical specification performances such as a high zoom ratio, a wide-angle arrangement, a reduced F-number and limited aberrations. With the zoom lens applied to a camera, the camera can be immediately put to the ready state unlike a collapsible-lens-mount camera, is made favorable for water-proofing and dust-proofing purposes and can be so much slimmed down in the depth direction.

According to one aspect of the present invention, the above object is achievable by the provision of a zoom lens, comprising a moving lens group B that has positive refracting power and moves only toward an object side of the zoom lens upon zooming from a wide-angle end to a telephoto end of the zoom lens, a lens group A that is located on the object side with respect to the moving lens group B, has negative refracting power and remains fixed during the zooming, and a third lens group C that is located on an image side of the zoom lens with respect to the moving lens group B and moves in a locus different from that of the moving lens group B during the zooming, characterized in that:

the lens group A that remains fixed during the zooming comprises, in order from an object side thereof, a negative lens element, a reflective optical element and a positive lens element having an absolute value of refracting power smaller than that of the negative lens element.

Another aspect of the present invention provides a zoom lens, comprising a moving lens group B that has positive refracting power and moves only toward an object side of the zoom lens upon zooming from a wide-angle end to a telephoto end of the zoom lens, a lens group A that is located on the object side with respect to the moving lens group B, has negative refracting power and remains fixed during the zooming, and a third lens group C that is located on an image side of the zoom lens with respect to the moving lens group B and moves in a locus different from that of the moving lens group B during the zooming, characterized in that:

the lens group A that remains fixed during the zooming comprises, in order from an object side thereof, a negative lens element, a reflective optical element and a plastic meniscus lens element having an aspheric surface.

The advantages of, and the requirements for, the above arrangements of the present invention are now explained.

To attain the aforesaid object, the present invention relies upon a zoom lens type that comprises a moving lens group B that has positive refracting power and moves only toward an object side of the zoom lens upon zooming from a wide-angle end to a telephoto end of the zoom lens, a lens group A that is located on the object side with respect to the moving lens group B, has negative refracting power and remains fixed during the zooming, and a third lens group C that is located on an image side of the zoom lens with respect to the moving lens group B and moves in a locus different from that of the moving lens group B during the zooming.

By adding the following requirements to the zoom lens, that zoom lens can be constructed of a reduced number of lens elements while maintaining high optical specification performances, even when the first lens group is designed to remain fixed.

The lens group A that remains fixed during zooming comprises, in order from its object side, one negative lens element, a reflective optical element for bending an optical path and a positive lens element having weak refracting power.

The positive lens element having weak refracting power is herein defined by a positive lens element in which the absolute value of refracting power is smaller than that of the negative lens element in the lens group A.

It is acceptable to locate other lens group or groups between the moving lens group B and the lens group A that remains fixed during zooming. To cut down the length of the zoom lens, it is preferable to interpose a variable air separation between the moving lens group B and the lens group A that remains fixed during zooming. More preferably, the lens group A that remains fixed during zooming should be positioned nearest to the object side of the zoom lens because it is possible to prevent the entrance surface of the zoom lens from becoming bulky.

The moving lens group B comprises a positive lens element having at least one aspheric surface and a negative lens element.

The third lens group C comprises one positive lens element.

As will be understood from Examples 2 and 3 given later, the lens element located nearest to the image plane side of the lens group A, because of having weak refracting power, can be composed of a plastic lens element. The reason is that even when that lens element is formed of a plastic material that is vulnerable to physical changes due to temperature or humidity, its deterioration in performance due to temperature or humidity is minimized. With the use of plastics ensuring ready processing of aspheric lenses, it is possible to achieve zoom lenses that are more inexpensive and have higher performances than ever before.

To reduce the depth dimension of a phototaking optical system while the entrance surface is directed to the object side, the optical path should preferably be bent at a position as close to the object side as possible and at a position where ray heights are low. To dispense with a collapsible lens mount and for water-proofing and dust-proofing purposes, the moving lens group should preferably be located at an image side with the position where the optical path is bent.

To reduce the optical path-bending space as much as possible, it is preferable that the heights of all rays contributing to image formation in the vicinity of the optical path-bending position are low. With this in mind, it is desired that the composite focal length of a partial system from the lens element nearest to the object side, where the optical path-bending position is located, to just before the lens group that is movable during zooming is negative.

With a zoom lens arrangement wherein, as intended herein, the lens group A having negative refracting power and located nearest to the object side remains fixed, the optical path can more easily be bent thereby slimming down the depth dimension. Especially, it is preferred that a reflective optical element is inserted into the lens group A to bend the optical path. Preferably in this case, the lens group A should comprise a negative lens element, a reflective optical element for bending the optical path and a positive lens element.

Whatever the zoom type, it is preferable to satisfy the following condition (1) with respect to the optical path length d, as calculated on an air basis, from a surface of the lens element located on the object side with respect to the reflective optical element wherein that surface is located nearest to the image side to a surface of the lens element located on the image side with respect to the reflective optical element wherein that surface is located nearest to the object side.

$$1.0 < d/L < 2.0 \tag{1}$$

Here d is the optical path length, as calculated on an air basis, from a surface of an object side-lens component located on the object side of the zoom lens with respect to the reflective optical element in the lens group A wherein the surface is located nearest to an image side of the object side-lens component to a surface of an image side-lens component located on an image side of the zoom lens with respect to the reflective optical element in the lens group A wherein the surface is located nearest to an object side of the image side-lens component, and L is a diagonal length of an effective image pickup area of the electronic image pickup device. It is here presumed that the electronic image pickup device should be used at a wide-angle-end angle of view of 55° or greater.

Exceeding the upper limit of 2.0 to the above condition (1) renders the object side-optical elements inclusive of the prism that is the reflective optical element likely to increase in size, and is unfavorable for correction of aberrations as well. In addition, the composite magnification of the second and subsequent lens groups becomes low, resulting in an increase in the amount of movement of the lens group B or rendering it difficult to ensure high zoom ratios. As the lower limit of 1.0 is not reached, a light beam contributing to image formation at the rim of an image does not satisfactorily arrive at the image plane or ghosts tend to occur.

More preferably, $$1.1 < d/L < 1.7 \tag{1}'$$

Most preferably, $$1.2 < d/L < 1.5 \tag{1}''$$

For size reductions of the object side-optical elements inclusive of the prism and correction of aberrations, the reflective optical element should preferably be composed of a prism formed of a medium having a high refractive index. That is, $$1.5 < n_{PRI} \tag{2}$$

Here $n_{PRI}$ is the d-line refractive index of the prism medium.

When the reflective optical element is formed of a prism, that prism should preferably have as high a refractive index as possible. Falling short of the lower limit of 1.5 to condition (2) renders the object side-optical elements inclusive of the prism likely to increase in size, and is unfavorable for correction of aberrations as well. In addition, the composite magnification of the lens group B and the subsequent lens group or groups becomes low, resulting in an increase in the amount of movement of the lens group B or rendering it difficult to ensure high zoom ratios. The upper limit to condition (2) may prima facie be set at 1.90. As that upper limit is exceeded, ghosts are likely to occur by total reflection. The upper limit should be set at preferably 1.87, and more preferably at 1.84.

More preferably, $$1.6 < n_{PRI} \tag{2}'$$

Most preferably, $$1.7 < n_{PRI} \tag{2}''$$

Whatever the zoom type, it is acceptable to configure the reflecting surfaces in forms other than a planar form, thereby making a paraxial refracting power profile proper. It is then preferable to rely on a control system having a freely variable reflecting surface thereby making correction of fluctuations of focal position and aberrations with zooming or make use of a variable shape mirror whose shape is controllable for focusing or zooming. Apart from this, it is acceptable to use as the reflective optical element a prism with a planoconcave lens element cemented to its planar portion, or configure an effective ray transmitting surface or a reflecting surface of the prism in curved forms. While the lens element in the lens group A, located nearest to the object side thereof, remains fixed during zooming, it is understood that the lens element located nearest to the image side thereof may be designed to be movable because it can move with relative ease. Preferably in that case, the lens element should move toward the image side in a convex locus during zooming.

For each of the zoom lens arrangements as described above, it is preferable to satisfy the following conditions (3), (4) and (5) with respect to the lens groups A and B.

$$1.2 < -f_A/\sqrt{(f_W \cdot f_T)} < 2.4 \quad (3)$$

$$1.0 < f_B/\sqrt{(f_W \cdot f_T)} < 1.8 \quad (4)$$

$$0.4 < \log \gamma_B / \log \gamma < 1.1 \quad (5)$$

Here $f_A$ is the focal length of the lens group A, $f_B$ is the focal length of the lens group B, $f_W$ is the focal length of the zoom lens at the wide-angle end, $f_T$ is the focal length of the zoom lens at the telephoto end, and $\gamma$ is $f_T/f_W$ and $\gamma_B$ is the magnification of the lens group B at the telephoto end/a magnification of the lens group B at the wide-angle end.

Condition (3) defines the proper focal length range for the lens group A. As the upper limit of 2.4 is exceeded, it is difficult to ensure sufficient zoom ratios, and as the lower limit of 1.2 is not reached, it is difficult to make correction of off-axis aberrations such as distortion.

Condition (4) represents the proper focal length range for the lens group B. As the upper limit of 1.8 is exceeded, the optical system becomes long, and as the lower limit of 1.0 is not reached, it is difficult to make correction for spherical aberrations and coma.

Condition (5) defines the zoom ratio of the lens group B upon zooming from the wide-angle end to the telephoto end. As the upper limit of 1.1 is exceeded, the amount of movement of the lens group B upon zooming increases, and as the lower limit of 0.4 is not reached, loads are applied on the lens group or groups having a zooming action excepting the lens group B, leading generally to an increase in the number of lens elements.

More preferably, at least one or all of the following conditions (3)', (4)' and (5)' should be satisfied.

$$1.4 < -f_A/\sqrt{(f_W \cdot f_T)} < 2.3 \quad (3)'$$

$$1.2 < f_B/\sqrt{(f_W \cdot f_T)} < 1.6 \quad (4)'$$

$$0.5 < \log \gamma_B / \log \gamma < 1.0 \quad (5)'$$

Even more preferably, at least one of the following conditions (3)", (4)" and (5)" should be satisfied.

$$1.6 < -f_A/\sqrt{(f_W \cdot f_T)} < 2.2 \quad (3)''$$

$$1.3 < f_B/\sqrt{(f_W \cdot f_T)} < 1.5 \quad (4)''$$

$$0.6 < \log \gamma_B / \log \gamma < 0.9 \quad (5)''$$

Most preferably, all the conditions (3)", (4)" and (5)" should be satisfied.

When a lens element having weak refracting power is used for the lens group A, it is preferable to add the following requirement thereto, because it is possible to obtain an optical path-bending zoom lens that has much higher specification performances and much simpler construction, making contribution to further size reductions of an imaging system.

$$-0.3 < f_{11}/f_{12} < 0.1 \quad (6)$$

Here $f_{11}$ is the focal length of the negative lens element located on the object side with respect to the reflective optical element in the lens group A, and $f_{12}$ is the focal length of the positive lens element located on the image side with respect to the reflective optical element in the lens group A.

Any deviation from the upper limit of 0.1 and the lower limit of −0.3 to condition (6) renders the bending optical element likely to increase in size.

More preferably, $$-0.2 < f_{11}/f_{12} < 0.05 \quad (6)'$$

Most preferably, $$-0.1 < f_{11}/f_{12} < 0.02 \quad (6)''$$

Further, the following condition (7) should preferably be satisfied with respect to the moving lens group B.

$$0.5 < (R_{22F}+R_{22R})/(R_{22F}-R_{22R}) < 2.8 \quad (7)$$

where $R_{22F}$ is the axial radius of curvature of a surface of a lens component located nearest to the image side of the moving lens group B wherein the surface is located nearest to the object side of the lens component, and $R_{22R}$ is the axial radius of curvature of a surface of the lens component nearest to the image side of the moving lens group B wherein the surface is located nearest to the image side of the lens component, provided that the lens component means a single lens or a cemented lens wherein a lens that contacts air on the object side and the image side along an optical path is thought of as one unit.

Exceeding the upper limit of 2.8 to condition (7) may be favorable for correction of spherical aberrations, coma and astigmatism throughout the optical system; however, the assembly of the lens group B becomes difficult because of an increase in the relative decentration sensitivity between two lens elements therein. As the lower limit of 0.5 is not reached, it is difficult to make correction for spherical aberrations, coma and astigmatism throughout the optical system.

More preferably, $$0.7 < (R_{22F}+R_{22R})/(R_{22F}-R_{22R}) < 2.4 \quad (7)'$$

Most preferably, $$0.8 < (R_{22F}+R_{22R})/(R_{22F}-R_{22R}) < 2.1 \quad (7)''$$

Furthermore, the following condition (8) should preferably be satisfied with respect to correction of chromatic aberrations.

$$14 < \nu_{21} - \nu_{22} \quad (8)$$

Here $\nu_{21}$ is the d-line based Abbe number of the object side-lens element in the moving lens group B, and $\nu_{22}$ is the d-line based Abbe number of the image side-lens element in the moving lens group B.

As the lower limit of 14 to condition (8) is not reached, correction of longitudinal chromatic aberration tends to become insufficient. The upper limit to condition (8) may prima facie be set at 70 because the material used is inexpensive.

More preferably, $$18 < \nu_{21} - \nu_{22} \quad (8)'$$

Most preferably, $$22 < \nu_{21} - \nu_{22} \quad (8)''$$

More preferably, the following conditions (9) and (10) should be satisfied.

$$-1.0 < (R_{21F}+R_{21R})/(R_{21F}-R_{21R}) < 0.4 \quad (9)$$

$$-2.0 < L/f_{22} < -0.2 \quad (10)$$

where $R_{21F}$ is the axial radius of curvature of a surface of the object side-lens component in the moving lens group B wherein the surface is located nearest to an object side of the object side-lens component, $R_{21R}$ is the axial radius of curvature of a surface of the object side-lens component in the moving lens group B wherein the surface is located nearest to an image side of the object side-lens component, L is the diagonal length of an effective image pickup area of the electronic image pickup device, and $f_{22}$ is the focal length of the image side-lens component in the moving lens group B, provided that the lens component means a single lens or a cemented lens wherein a lens that contacts air on the object side and the image side along an optical path is thought of as one unit.

In view of correction of aberrations, the lens group A has negative refracting power, and so a divergent light beam is incident on the lens group B. Accordingly, any deviation from the upper limit of 0.4 and the lower limit of −1.0 to condition (9) that defines a shape factor condition for the object side-positive lens component in the vicinity of the optical axis renders correction of spherical aberrations difficult, even when a plurality of aspheric surfaces are introduced to the object side of the lens group B.

As the lower limit of −2.0 to condition (10) is not reached, an exit pupil position comes close to the image plane, often causing shading and an increase in the decentration sensitivity between two lens components in the lens group B. As the upper limit of −0.2 is exceeded, it is difficult to ensure high zoom ratios while compactness is maintained.

More preferably, the following conditions (9)' and/or (10)' should be satisfied.

$$-0.8<(R_{21F}+R_{21R})/(R_{21F}-R_{21R})<0.2 \quad (9)'$$

$$-1.7<L/f_{22}<-0.5 \quad (10)'$$

Even more preferably, the following conditions (9)" or (10)" should be satisfied.

$$-0.6<(R_{21F}+R_{21R})/(R_{21F}-R_{21R})<0.15 \quad (9)''$$

$$-1.6<L/f_{22}<-0.9 \quad (10)''$$

Most preferably, both conditions (9)" and (10)" should be satisfied.

Furthermore, the following condition (11) should preferably be satisfied with respect to the third lens group C.

$$0.0<L/f_C<0.8 \quad (11)$$

Here $f_C$ is the focal length of the third lens group C, and L is the diagonal length of an effective image pickup area of the electronic image pickup device.

As the lower limit of 0.0 to condition (11) is not reached, the exit pupil position at the wide-angle end tends to come close to the image plane, and as the upper limit of 0.8 is exceeded, the amount of fluctuations of the exit pupil position with zooming becomes too large. In either case, shading often occurs.

More preferably, $$0.2<L/f_C<0.8 \quad (11)'$$

Most preferably, $$0.4<L/f_C<0.8 \quad (11)''$$

The aforesaid zoom lens according to the present invention should preferably have a zoom ratio ranging from 1.8 to 5.0 inclusive. A zoom ratio falling short of 1.8 is generally less than satisfactory, and a zoom ratio exceeding 5.0 causes an increase in the amount of lens movement, rendering it difficult to achieve compactness in the optical path-bending direction.

It is noted that the zoom lens according to the present invention may comprise, in order from its object side, the lens group A that remains fixed during zooming, the moving lens group B and the third lens group C, three lens groups in all. By comprising three such lens groups, the zoom lens can be made compact.

According to the zoom lens of the present invention, focusing may be carried out by movement of the lens group B; however, it is understood that focusing should preferably be performed with the third lens group C because of some margin of focusing space at the telephoto end.

It is understood that only the upper limit or only the lower limit may be applied to each of the above conditions, and that the values of these conditions in each of the following examples may be extended as far as the upper or lower limits thereof.

Still other objects and advantages of the invention will in part be obvious and will in part be apparent from the specification.

The invention accordingly comprises the features of construction, combinations of elements, and arrangement of parts that will be exemplified in the construction hereinafter set forth, and the scope of the invention will be indicated in the claims.

BRIEF DESCRIPTION OF THE DRAWINGS

FIGS. 1(a) and 1(b) are illustrative in section of Example 1 of the zoom lens according to the present invention at the wide-angle end (a), and at the telephoto end (b), respectively, when the zoom lens is focused on an object point at infinity.

FIGS. 2(a) and 2(b) are illustrative in section of Example 2 of the zoom lens, similar to FIGS. 1(a) and 1(b).

FIGS. 3(a) and 3(b) are illustrative in section of Example 3 of the zoom lens, similar to FIGS. 1(a) and 1(b).

DESCRIPTION OF THE PREFERRED EMBODIMENTS

Examples 1 to 3 of the zoom lens according to the present invention are now explained. Sectional lens configurations of Examples 1 to 3 at the wide-angle end (a), and at the telephoto end (b) upon focused on an object point at infinity are shown in FIGS. 1 to 3. Throughout FIGS. 1 to 3, the first lens group is indicated by G1, a stop by S, the second lens group by G2, the third lens group by G3, an optical low-pass filter by LF, a cover glass for an electronic image pickup device CCD by CG, and the image plane of CCD by I. A plane-parallel plate, that is, the taken-apart optical path-bending prism in the first lens group G1 is indicated by P. It is noted that instead of the near-infrared sharp cut coat, it is acceptable to use an optical low-pass filter LF coated directly with a near-infrared sharp cut coat, an infrared cut absorption filter or a transparent plane plate with a near-infrared sharp cut coat applied on its entrance surface.

Figure 4:
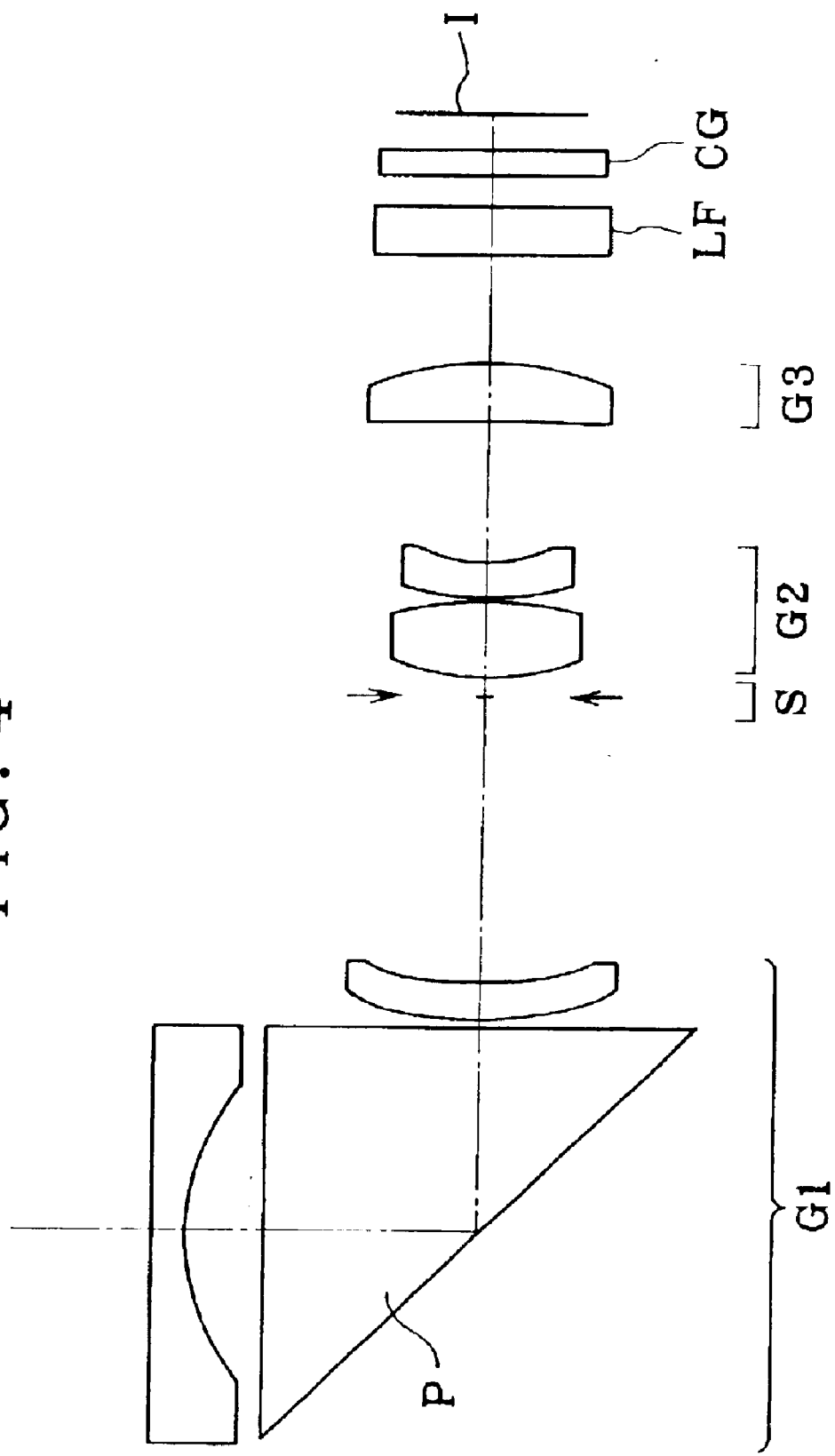
FIG. 4 is an optical path diagram for Example 2 of the zoom lens when the optical path is bent upon focused on an infinite object point at the wide-angle end.

As shown typically in FIG. 4 that is an optical path diagram for Example 2 of the zoom lens upon focused on an infinite object point at the wide-angle end, the optical path-bending prism P is configured as a reflecting prism for bending the optical path through 90°.

EXAMPLE 1

As shown in FIGS. 1(a) and 1(b), Example 1 is directed to a zoom lens made up of a first lens group G1 composed of a double-concave negative lens element, an optical path-bending prism P and a positive meniscus lens element convex on its object side, an aperture stop S, a second lens group G2 composed of a double-convex positive lens element and a double-concave negative lens element and a third lens group G3 composed of one double-convex positive lens element. Upon zooming from the wide-angle end to the telephoto end of the zoom lens, the first lens group G1 remains fixed, and the second lens group G2 moves together with the aperture stop S toward the object side and then the image plane side of the zoom lens.

Five aspheric surfaces are used; one at the image plane side-surface of the double-concave negative lens element in the first lens group G1, one at the object side-surface of the double-convex positive lens element in the second lens group G2, two at both surfaces of the double-concave negative lens element in the second lens group G2 and one at the image plane side-surface of the double-convex positive lens element in the third lens group G3.

EXAMPLE 2

As shown in FIGS. 2(a) and 2(b), Example 2 is directed to a zoom lens made up of a first lens group G1 composed of a planoconcave negative lens element, an optical path-bending prism P and a positive meniscus lens element convex on its object side, an aperture stop S, a second lens group G2 composed of a double-convex positive lens element and a negative meniscus lens element convex on its object side and a third lens group G3 composed of one positive meniscus lens element convex on its image plane side. Upon zooming from the wide-angle end to the telephoto end of the zoom lens, the first lens group G1 remains fixed, and the second lens group G2 moves together with the aperture stop S toward the object side and then the image plane side of the zoom lens.

Five aspheric surfaces are used; two at both surfaces of the positive meniscus lens element in the first lens group G1, two at both surfaces of the double-convex positive lens element in the second lens group G2 and one at the image plane side-surface of the positive meniscus lens element in the third lens group G3.

EXAMPLE 3

As shown in FIGS. 3(a) and 3(b), Example 3 is directed to a zoom lens made up of a first lens group G1 composed of a negative meniscus lens element convex on its object side, an optical path-bending prism P and a meniscus lens element convex on its object side, an aperture stop S, a second lens group G2 composed of a double-convex positive lens element and a negative meniscus lens element convex on its object side and a third lens group G3 composed of one planoconvex positive lens element. Upon zooming from the wide-angle end to the telephoto end of the zoom lens, the first lens group G1 remains fixed, and the second lens group G2 moves together with the aperture stop S toward the object side and then the image plane side of the zoom lens.

Four aspheric surfaces are used; two at both surfaces of the meniscus lens element located just after the optical path-bending prism P in the first lens group G1, and two at both surfaces of the double-convex positive lens element in the second lens group G2.

Throughout Examples 1 to 3, the first lens group G1 is tantamount to the lens group A of the present invention, the second lens group G2 to the lens group B of the present invention, and the third lens group G3 to the lens group C of the present invention.

The numerical data on each example are given below. Symbols used hereinafter but not hereinbefore have the following meanings:

f: focal length of the zoom lens
ω: half angle of view
$F_{NO}$: F-number
WE: wide-angle end
ST: intermediate state
TE: telephoto end
$r_1, r_2, \ldots$: radius of curvature of each lens surface
$d_1, d_2, \ldots$: spacing between the adjacent lens surfaces
$n_{d1}, n_{d2}, \ldots$: d-line refractive index of each lens element
$v_{d1}, v_{d2}, \ldots$: Abbe number of each lens element Here let x be an optical axis on condition that the direction of propagation of light is positive and y be a direction perpendicular to the optical axis. Then, aspheric configuration is given by $$x=(y^2/r)/[1+\{1-(K+1)(y/r)^2\}^{1/2}]+A_4y^4+A_6y^6+A_8y^8+A_{10}y^{10}$$

where r is a paraxial radius of curvature, K is a conical coefficient, and $A_4$, $A_6$, $A_8$ and $A_{10}$ are the fourth, sixth, eighth and tenth aspheric coefficients, respectively.

EXAMPLE 1

| | | | |
|---|---|---|---|
| $r_1 = -68.745$ | $d_1 = 1.00$ | $n_{d1} = 1.49700$ | $\nu_{d1} = 81.54$ |
| $r_2 = 9.526$ (Aspheric) | $d_2 = 2.15$ | | |
| $r_3 = \infty$ | $d_3 = 12.50$ | $n_{d2} = 1.78590$ | $\nu_{d2} = 44.20$ |
| $r_4 = \infty$ | $d_4 = 0.10$ | | |
| $r_5 = 15.276$ | $d_5 = 1.46$ | $n_{d3} = 1.84666$ | $\nu_{d3} = 23.78$ |
| $r_6 = 16.094$ | $d_6 =$ (Variable) | | |
| $r_7 = \infty$ (Stop) | $d_7 = 0.50$ | | |
| $r_8 = 8.164$ (Aspheric) | $d_8 = 4.57$ | $n_{d4} = 1.72916$ | $\nu_{d4} = 54.68$ |
| $r_9 = -6.072$ | $d_9 = 0.10$ | | |
| $r_{10} = -45.541$ (Aspheric) | $d_{10} = 2.87$ | $n_{d5} = 1.67270$ | $\nu_{d5} = 32.10$ |
| $r_{11} = 3.363$ (Aspheric) | $d_{11} =$ (Variable) | | |
| $r_{12} = 13.441$ | $d_{12} = 4.77$ | $n_{d6} = 1.48749$ | $\nu_{d6} = 70.23$ |
| $r_{13} = -6.927$ (Aspheric) | $d_{13} =$ (Variable) | | |
| $r_{14} = \infty$ | $d_{14} = 1.44$ | $n_{d7} = 1.54771$ | $\nu_{d7} = 62.84$ |
| $r_{15} = \infty$ | $d_{15} = 0.80$ | | |
| $r_{16} = \infty$ | $d_{16} = 0.80$ | $n_{d8} = 1.51633$ | $\nu_{d8} = 64.14$ |
| $r_{17} = \infty$ | $d_{17} = 0.99$ | | |
| $r_{18} = \infty$ (Image Plane) | | | |

Aspherical Coefficients
2nd surface
$K = 0.000$
$A_4 = -1.47020 \times 10^{-4}$
$A_6 = -1.59222 \times 10^{-6}$
$A_8 = -6.66878 \times 10^{-9}$
$A_{10} = 0.000$
8th surface
$K = 0.000$
$A_4 = -6.94821 \times 10^{-4}$
$A_6 = -2.86561 \times 10^{-5}$
$A_8 = -4.95151 \times 10^{-6}$
$A_{10} = 0.000$
10th surface
$K = 0.000$
$A_4 = -3.19713 \times 10^{-3}$
$A_6 = 8.56764 \times 10^{-5}$
$A_8 = 5.81075 \times 10^{-6}$
$A_{10} = 0.000$
11th surface
$K = 0.000$
$A_4 = -5.77833 \times 10^{-3}$
$A_6 = 8.21103 \times 10^{-5}$
$A_8 = -8.65867 \times 10^{-6}$
$A_{10} = 0.000$
13th surface
$K = 0.000$
$A_4 = 1.34319 \times 10^{-3}$
$A_6 = -2.07768 \times 10^{-5}$
$A_8 = 4.03234 \times 10^{-7}$
$A_{10} = 0.000$

| Zooming Data ($\infty$) | WE | ST | TE |
|---|---|---|---|
| f (mm) | 5.953 | 8.441 | 12.014 |
| $F_{NO}$ | 2.88 | 3.66 | 4.50 |
| $\omega$ (°) | 30.8 | 22.6 | 16.3 |
| $d_6$ | 9.19 | 5.25 | 0.71 |
| $d_{11}$ | 1.00 | 5.52 | 10.02 |
| $d_{13}$ | 0.83 | 0.24 | 0.30 |

EXAMPLE 2

| | | | |
|---|---|---|---|
| $r_1 = \infty$ | $d_1 = 1.00$ | $n_{d1} = -1.49700$ | $\nu_{d1} = 81.54$ |
| $r_2 = 7.168$ | $d_2 = 2.16$ | | |
| $r_3 = \infty$ | $d_3 = 12.50$ | $n_{d2} = 1.78590$ | $\nu_{d2} = 44.20$ |
| $r_4 = \infty$ | $d_4 = 0.10$ | | |
| $r_5 = 13.350$ (Aspheric) | $d_5 = 1.20$ | $n_{d3} = 1.58423$ | $\nu_{d3} = 30.49$ |
| $r_6 = 14.266$ (Aspheric) | $d_6 =$ (Variable) | | |
| $r_7 = \infty$ (Stop) | $d_7 = 0.50$ | | |
| $r_8 = 5.505$ (Aspheric) | $d_8 = 2.42$ | $n_{d4} = 1.74330$ | $\nu_{d4} = 49.33$ |
| $r_9 = -17.881$ (Aspheric) | $d_9 = 0.13$ | | |
| $r_{10} = 11.191$ | $d_{10} = 0.95$ | $n_{d5} = 1.78472$ | $\nu_{d5} = 25.68$ |
| $r_{11} = 3.725$ | $d_{11} =$ (Variable) | | |
| $r_{12} = -92.855$ | $d_{12} = 1.74$ | $n_{d6} = 1.51633$ | $\nu_{d6} = 64.14$ |
| $r_{13} = -8.024$ (Aspheric) | $d_{13} =$ (Variable) | | |
| $r_{14} = \infty$ | $d_{14} = 1.44$ | $n_{d7} = 1.54771$ | $\nu_{d7} = 62.84$ |
| $r_{15} = \infty$ | $d_{15} = 0.80$ | | |
| $r_{16} = \infty$ | $d_{16} = 0.80$ | $n_{d8} = 1.51633$ | $\nu_{d8} = 64.14$ |
| $r_{17} = \infty$ | $d_{17} = 1.00$ | | |
| $r_{18} = \infty$ (Image Plane) | | | |

Aspherical Coefficients
5th surface
$K = 0.000$
$A_4 = 1.24207 \times 10^{-3}$
$A_6 = -1.46468 \times 10^{-5}$
$A_8 = 3.63201 \times 10^{-6}$
$A_{10} = 0.000$
6th surface
$K = 0.000$
$A_4 = 1.14608 \times 10^{-3}$
$A_6 = -2.98360 \times 10^{-5}$
$A_8 = 6.98137 \times 10^{-6}$
$A_{10} = 0.000$
8th surface
$K = 0.000$
$A_4 = -1.23629 \times 10^{-3}$
$A_6 = -1.01450 \times 10^{-4}$
$A_8 = 6.25603 \times 10^{-6}$
$A_{10} = -1.13189 \times 10^{-6}$
9th surface
$K = 0.000$
$A_4 = -5.48829 \times 10^{-4}$
$A_6 = -8.02445 \times 10^{-5}$
$A_8 = 1.81128 \times 10^{-7}$
$A_{10} = -4.99203 \times 10^{-7}$
13th surface
$K = 0.000$
$A_4 = 7.76316 \times 10^{-4}$
$A_6 = 9.12348 \times 10^{-8}$
$A_8 = -1.74080 \times 10^{-7}$
$A_{10} = 0.000$

| Zooming Data ($\infty$) | WE | ST | TE |
|---|---|---|---|
| f (mm) | 6.010 | 8.437 | 12.077 |
| $F_{NO}$ | 2.80 | 3.52 | 4.43 |
| $\omega$ (°) | 32.1 | 23.0 | 16.3 |
| $d_6$ | 8.70 | 5.12 | 1.46 |
| $d_{11}$ | 4.30 | 9.42 | 14.34 |
| $d_{13}$ | 3.16 | 1.61 | 0.37 |

EXAMPLE 3

| | | | |
|---|---|---|---|
| $r_1 = 47.403$ | $d_1 = 1.00$ | $n_{d1} = 1.49700$ | $\nu_{d1} = 81.54$ |
| $r_2 = 6.426$ | $d_2 = 2.59$ | | |
| $r_3 = \infty$ | $d_3 = 12.50$ | $n_{d2} = 1.78590$ | $\nu_{d2} = 44.20$ |
| $r_4 = \infty$ | $d_4 = 0.10$ | | |
| $r_5 = 45.064$ (Aspheric) | $d_5 = 1.20$ | $n_{d3} = 1.58423$ | $\nu_{d3} = 30.49$ |
| $r_6 = 41.299$ (Aspheric) | $d_6 =$ (Variable) | | |
| $r_7 = \infty$ (Stop) | $d_7 = 0.50$ | | |
| $r_8 = 4.982$ (Aspheric) | $d_8 = 2.86$ | $n_{d4} = 1.74330$ | $\nu_{d4} = 49.33$ |
| $r_9 = -19.763$ (Aspheric) | $d_9 = 0.30$ | | |
| $r_{10} = 10.671$ | $d_{10} = 0.80$ | $n_{d5} = 1.78472$ | $\nu_{d5} = 25.68$ |
| $r_{11} = 3.312$ | $d_{11} =$ (Variable) | | |
| $r_{12} = \infty$ | $d_{12} = 2.00$ | $n_{d6} = 1.51633$ | $\nu_{d6} = 64.14$ |
| $r_{13} = -9.083$ | $d_{13} =$ (Variable) | | |
| $r_{14} = \infty$ | $d_{14} = 1.44$ | $n_{d7} = 1.54771$ | $\nu_{d7} = 62.84$ |
| $r_{15} = \infty$ | $d_{15} = 0.80$ | | |
| $r_{16} = \infty$ | $d_{16} = 0.80$ | $n_{d8} = 1.51633$ | $\nu_{d8} = 64.14$ |
| $r_{17} = \infty$ | $d_{17} = 1.02$ | | |
| $r_{18} = \infty$ (Image Plane) | | | |

Aspherical Coefficients

-continued

5th surface
K = 0.000
$A_4 = 9.84126 \times 10^{-4}$
$A_6 = -1.87411 \times 10^{-5}$
$A_8 = 3.49505 \times 10^{-6}$
$A_{10} = 0.000$
6th surface
K = 0.000
$A_4 = 7.42301 \times 10^{-4}$
$A_6 = -3.81867 \times 10^{-5}$
$A_8 = 6.23611 \times 10^{-6}$
$A_{10} = 0.000$
8th surface
K = 0.000
$A_4 = -1.03059 \times 10^{-3}$
$A_6 = -3.70672 \times 10^{-5}$
$A_8 = 1.33030 \times 10^{-7}$
$A_{10} = -3.18164 \times 10^{-7}$
9th surface
K = 0.000
$A_4 = 1.22680 \times 10^{-4}$
$A_6 = 3.61206 \times 10^{-5}$
$A_8 = -1.91324 \times 10^{-5}$
$A_{10} = 1.13751 \times 10^{-6}$

| Zooming Data (∞) | WE | ST | TE |
|---|---|---|---|
| f (mm) | 6.071 | 8.435 | 12.065 |
| $F_{NO}$ | 2.89 | 3.61 | 4.54 |
| ω (°) | 32.2 | 23.9 | 17.2 |
| $d_6$ | 8.42 | 5.10 | 1.46 |
| $d_{11}$ | 3.47 | 8.29 | 12.92 |
| $d_{13}$ | 2.86 | 1.33 | 0.37 |

Figure 5A:
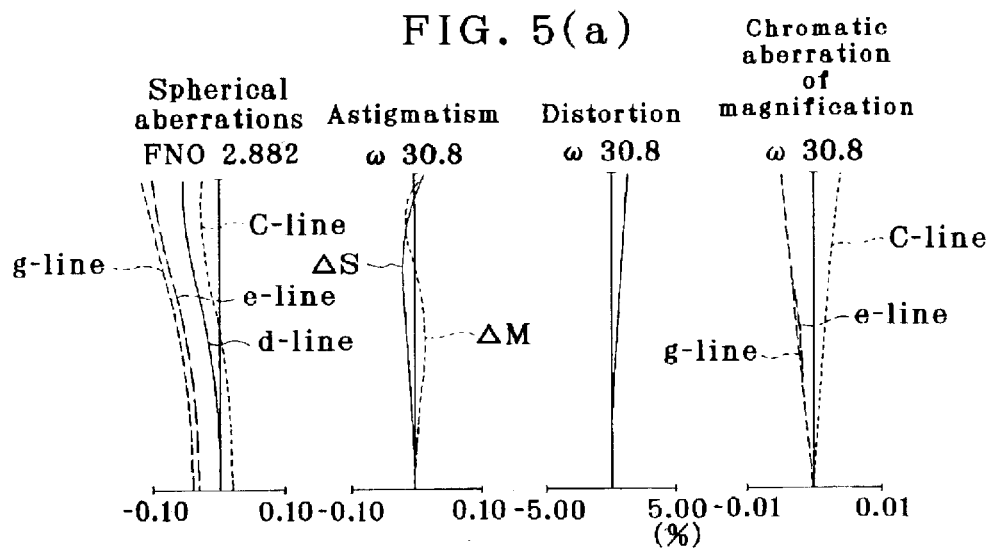
FIGS. 5(a), 5(b) and 5(c) are aberration diagrams for Example 1 upon focused on an object point at infinity.
Figure 5B:
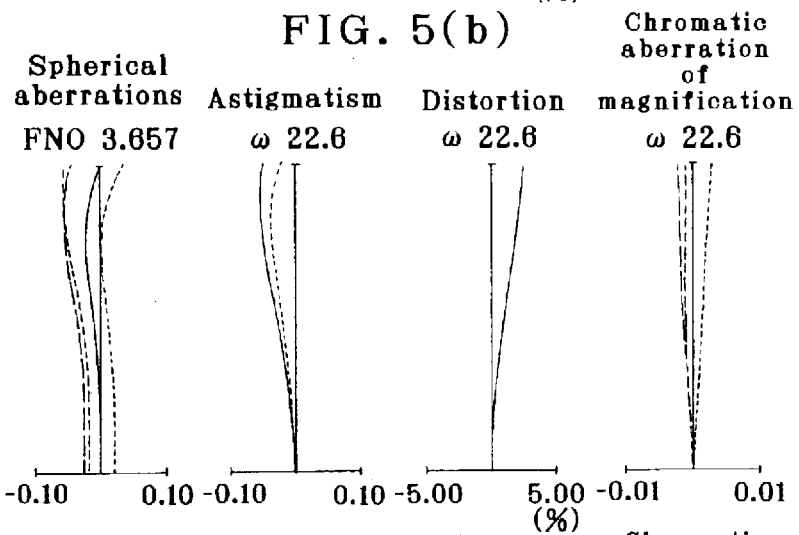
Figure 5C:
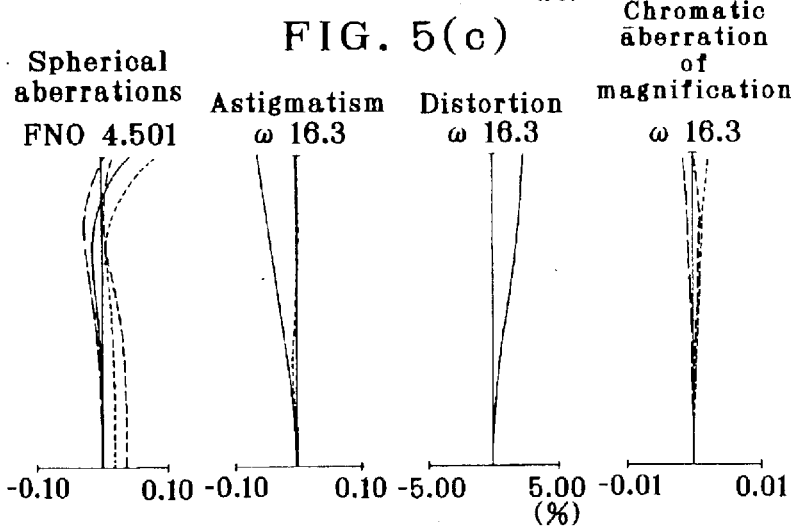

FIGS. 5(a), 5(b) and 5(c) are aberration diagrams for Example 1 upon focused on an object point at infinity, with (a), (b) and (c) representative of spherical aberrations, astigmatisms, distortions and chromatic aberrations of magnification (a) at the wide-angle end, (b) in an intermediate state and (c) at the telephoto end, respectively.

Enumerated below are the values of conditions (1) to (11) in the respective examples.

| | Example 1 | Example 2 | Example 3 |
|---|---|---|---|
| L | 7.2 | 7.2 | 7.2 |
| d/L | 1.284 | 1.286 | 1.346 |
| $n_{pri}$ | 1.7859 | 1.7859 | 1.7859 |
| $-f_A/\sqrt{(f_w \cdot f_T)}$ | 2.183 | 1.815 | 1.7 |
| $f_B/\sqrt{(f_w \cdot f_T)}$ | 1.495 | 1.418 | 1.34 |
| log $\gamma_B$/log $\gamma$ | 0.846 | 0.670 | 0.717 |
| $f_{11}/f_{12}$ | −0.086 | −0.06 | 0.016 |
| $(R_{22F} + R_{22R})/(R_{22F} - R_{22R})$ | 0.862 | 1.998 | 1.9 |
| $v_{12} - v_{22}$ | 22.58 | 23.65 | 23.65 |
| $(R_{21F} + R_{21R})/(R_{21F} - R_{21R})$ | 0.147 | −0.529 | −0.597 |
| $L/f_{22}$ | −1.583 | −0.955 | −1.12 |
| $L/f_c$ | 0.709 | 0.426 | 0.409 |

Figure 6:
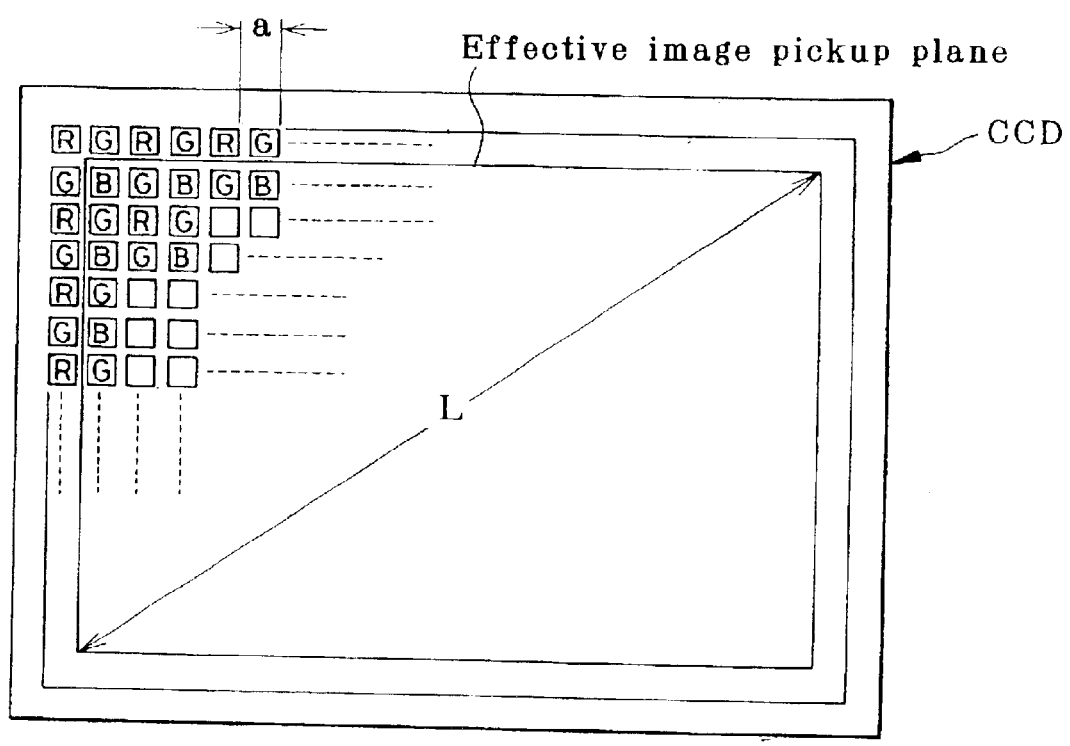
FIG. 6 is illustrative of the diagonal length of the effective image pickup plane of an electronic image pickup device upon phototaking.

Here the diagonal length L of the effective image pickup plane of the electronic image pickup device and the pixel spacing a are explained. FIG. 6 is illustrative of one exemplary pixel array for the electronic image pickup device, wherein R (red), G (green) and B (blue) pixels or four pixels, i.e., cyan, magenta, yellow and green (G) pixels (see FIG. 9) are mosaically arranged at the pixel spacing a. The "effective image pickup plane" used herein is understood to mean a certain area in the photoelectric conversion surface on an image pickup device used for the reproduction of a photo-taken image (on a personal computer or by a printer). The effective image pickup plane shown in FIG. 6 is set at an area narrower than the total photoelectric conversion surface on the image pickup device, depending on the performance of the optical system used (an image circle that can be ensured by the performance of the optical system). The diagonal length L of an effective image pickup plane is thus defined by that of the effective image pickup plane. Although the image pickup range used for image reproduction may be variable, it is noted that when the zoom lens of the present invention is used on an imaging system having such functions, the diagonal length L of its effective image pickup plane varies. In that case, the diagonal length L of the effective image pickup plane according to the present invention is defined by the maximum value in the possible widest range for L.

In each example of the present invention, on the image side of the final lens group there is provided a near-infrared cut filter or an optical low-pass filter LF with a near-infrared cut coat surface applied on its entrance side. This near-infrared cut filter or near-infrared cut coat surface is designed to have a transmittance of at least 80% at 600 nm wavelength and a transmittance of up to 10% at 700 nm wavelength. More specifically, the near-infrared cut filter or the near-infrared sharp cut coat has a multilayer structure made up of such 27 layers as mentioned below; however, the design wavelength is 780 nm.

| Substrate | Material | Physical Thickness (nm) | λ/4 |
|---|---|---|---|
| 1st layer | $Al_2O_3$ | 58.96 | 0.50 |
| 2nd layer | $TiO_2$ | 84.19 | 1.00 |
| 3rd layer | $SiO_2$ | 134.14 | 1.00 |
| 4th layer | $TiO_2$ | 84.19 | 1.00 |
| 5th layer | $SiO_2$ | 134.14 | 1.00 |
| 6th layer | $TiO_2$ | 84.19 | 1.00 |
| 7th layer | $SiO_2$ | 134.14 | 1.00 |
| 8th layer | $TiO_2$ | 84.19 | 1.00 |
| 9th layer | $SiO_2$ | 134.14 | 1.00 |
| 10th layer | $TiO_2$ | 84.19 | 1.00 |
| 11th layer | $SiO_2$ | 134.14 | 1.00 |
| 12th layer | $TiO_2$ | 84.19 | 1.00 |
| 13th layer | $SiO_2$ | 134.14 | 1.00 |
| 14th layer | $TiO_2$ | 84.19 | 1.00 |
| 15th layer | $SiO_2$ | 178.41 | 1.33 |
| 16th layer | $TiO_2$ | 101.03 | 1.21 |
| 17th layer | $SiO_2$ | 167.67 | 1.25 |
| 18th layer | $TiO_2$ | 96.82 | 1.15 |
| 19th layer | $SiO_2$ | 147.55 | 1.05 |
| 20th layer | $TiO_2$ | 84.19 | 1.00 |
| 21st layer | $SiO_2$ | 160.97 | 1.20 |
| 22nd layer | $TiO_2$ | 84.19 | 1.00 |
| 23rd layer | $SiO_2$ | 154.26 | 1.15 |
| 24th layer | $TiO_2$ | 95.13 | 1.13 |
| 25th layer | $SiO_2$ | 160.97 | 1.20 |
| 26th layer | $TiO_2$ | 99.34 | 1.18 |
| 27th layer | $SiO_2$ | 87.19 | 0.65 |
| Air | | | |

Figure 7:
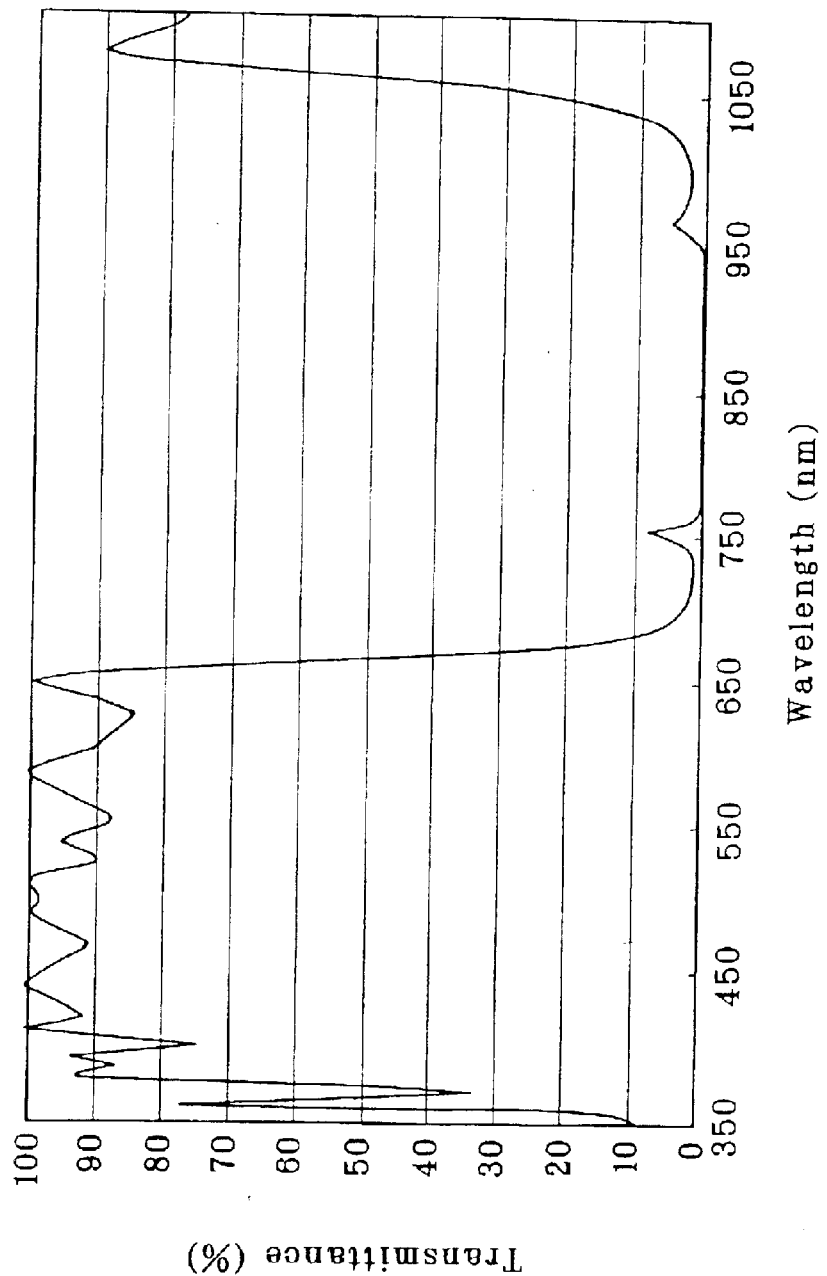
FIG. 7 is a diagram indicative of the transmittance characteristics of one example of the near-infrared sharp cut coat.

The aforesaid near-infrared sharp cut coat has such transmittance characteristics as shown in FIG. 7.

Figure 8:
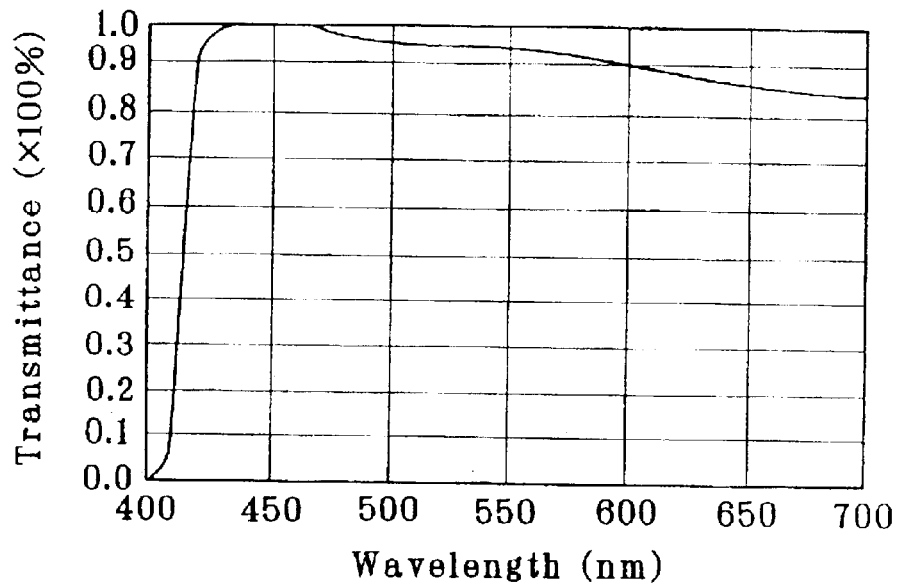
FIG. 8 is a diagram indicative of the transmittance characteristics of one example of the color filter located on the exit surface side of the low-pass filter.

The low-pass filter LF is provided on its exit surface side with a color filter or coat for reducing the transmission of colors at such a short wavelength region as shown in FIG. 8, thereby making the color reproducibility of an electronic image much higher.

Preferably, that filter or coat should be designed such that the ratio of the transmittance of 420 nm wavelength with respect to the highest transmittance of a wavelength that is found in the range of 400 nm to 700 nm is at least 15% and that the ratio of 400 nm wavelength with respect to the highest wavelength transmittance is up to 6%.

It is thus possible to reduce a discernible difference between the colors perceived by the human eyes and the colors of the image to be picked up and reproduced. In other words, it is possible to prevent degradation in images due to the fact that a color of short wavelength less likely to be perceived through the human sense of sight can be readily seen by the human eyes.

When the ratio of the 400 nm wavelength transmittance is greater than 6%, the short wavelength region less likely to be perceived by the human eyes would be reproduced with perceivable wavelengths. Conversely, when the ratio of the 420 nm wavelength transmittance is less than 15%, a wavelength region perceivable by the human eyes is less likely to be reproduced, putting colors in an ill-balanced state.

Such means for limiting wavelengths can be more effective for imaging systems using a complementary colors mosaic filter.

In each of the aforesaid examples, coating is applied in such a way that, as shown in FIG. 8, the transmittance for 400 nm wavelength is 0%, the transmittance for 420 nm is 90%, and the transmittance for 440 nm peaks or reaches 100%.

With the synergistic action of the aforesaid near-infrared sharp cut coat and that coating, the transmittance for 400 nm is set at 0%, the transmittance for 420 nm at 80%, the transmittance for 600 nm at 82%, and the transmittance for 700 nm at 2% with the transmittance for 450 nm wavelength peaking at 99%, thereby ensuring more faithful color reproduction.

The low-pass filter LF is made up of three different filter elements stacked one upon another in the optical axis direction, each filter element having crystal axes in directions where, upon projected onto the image plane, the azimuth angle is horizontal (=0°) and ±45° therefrom. Three such filter elements are mutually displaced by $\underline{a}$ μm in the horizontal direction and by SQRT(½)×$\underline{a}$ in the ±45° direction for the purpose of moiré control, wherein SQRT means a square root.

Figure 9:
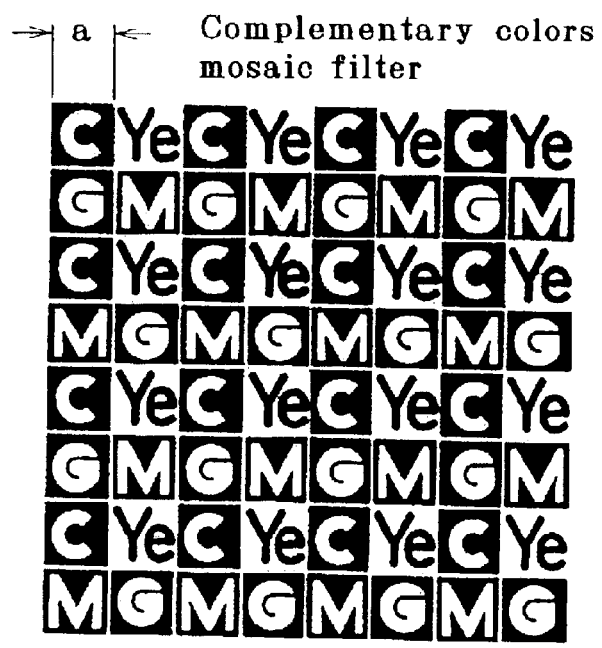
FIG. 9 is a schematic illustrative of how the color filter elements are arranged in the complementary colors mosaic filter.

The image pickup plane I of a CCD is provided thereon with a complementary colors mosaic filter wherein, as shown in FIG. 9, color filter elements of four colors, cyan, magenta, yellow and green are arranged in a mosaic fashion corresponding to image pickup pixels. More specifically, these four different color filter elements, used in almost equal numbers, are arranged in such a mosaic fashion that neighboring pixels do not correspond to the same type of color filter elements, thereby ensuring more faithful color reproduction.

To be more specific, the complementary colors mosaic filter is composed of at least four different color filter elements as shown in FIG. 9, which should preferably have such characteristics as given below.

Each green color filter element G has a spectral strength peak at a wavelength $G_P$, each yellow filter element $Y_e$ has a spectral strength peak at a wavelength $Y_P$, each cyan filter element C has a spectral strength peak at a wavelength $C_P$, and each magenta filter element M has spectral strength peaks at wavelengths $M_{P1}$ and $M_{P2}$, and these wavelengths satisfy the following conditions.

510 nm<$G_P$<540 nm 5 nm<$Y_P$−$G_P$<35 nm

−100 nm<$C_P$−$G_P$<−5 nm 430 nm<$M_{P1}$<480 nm 580 nm<$M_{P2}$<640 nm

To ensure higher color reproducibility, it is preferred that the green, yellow and cyan filter elements have a strength of at least 80% at 530 nm wavelength with respect to their respective spectral strength peaks, and the magenta filter elements have a strength of 10% to 50% at 530 nm wavelength with their spectral strength peak.

Figure 10:
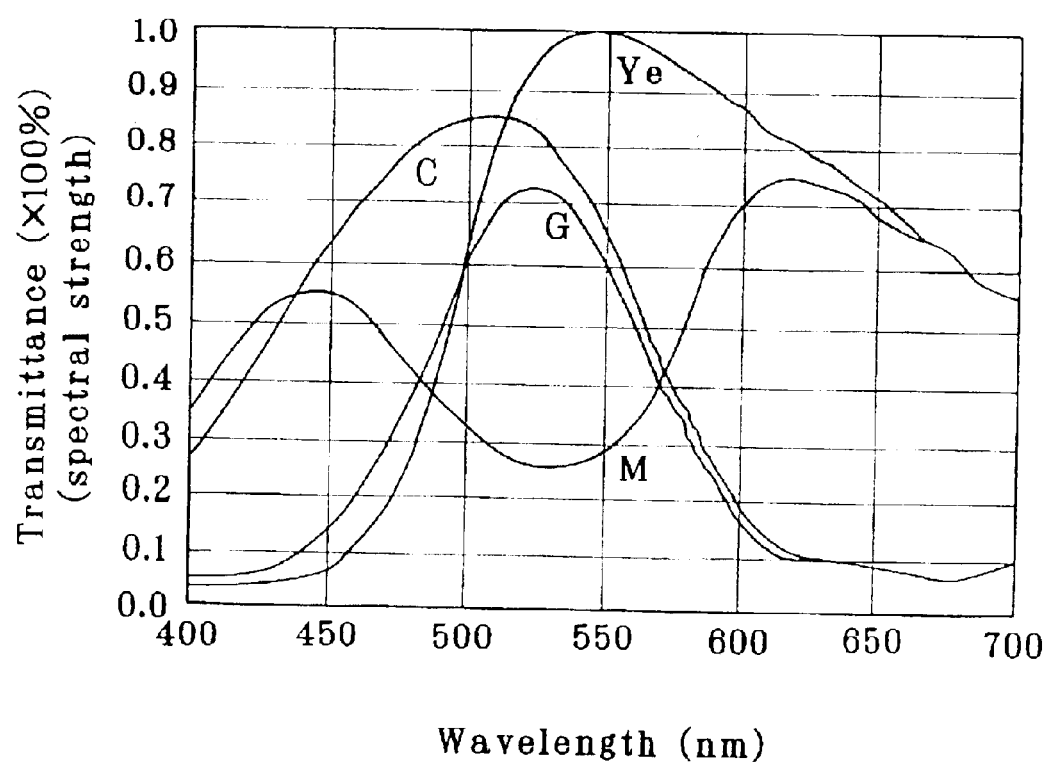
FIG. 10 is a diagram indicative of one example of the wavelength characteristics of the complementary colors mosaic filter.

One example of the wavelength characteristics in the aforesaid respective examples is shown in FIG. 10. The green filter element G has a spectral strength peak at 525 nm. The yellow filter element $Y_e$ has a spectral strength peak at 555 nm. The cyan filter element C has a spectral strength peak at 510 nm. The magenta filter element M has peaks at 445 nm and 620 nm. At 530 nm, the respective color filter elements have, with respect to their respective spectral strength peaks, strengths of 99% for G, 95% for $Y_e$, 97% for C and 38% for M.

For such a complementary colors filter, such signal processing as mentioned below is electrically carried out by means of a controller (not shown) (or a controller used with digital cameras).

For luminance signals, $$Y=|G+M+Y_e+C|\times¼$$

For chromatic signals, $$R-Y=|(M+Y_e)-(G+C)|$$

$$B-Y=|(M+C)-(G+Y_e)|$$

Through this signal processing, the signals from the complementary colors filter are converted into R (red), G (green) and B (blue) signals.

In this regard, it is noted that the aforesaid near-infrared sharp cut coat may be located anywhere on the optical path, and that the number of low-pass filters LF may be either two as mentioned above or one.

The present electronic imaging system constructed as described above may be applied to phototaking systems where object images formed through zoom lenses are received at image pickup devices such as CCDs or silver-halide films, inter alia, digital cameras or video cameras as well as PCs and telephone sets that are typical information processors, in particular, easy-to-carry cellular phones. Given below are some such embodiments.

Figure 11:
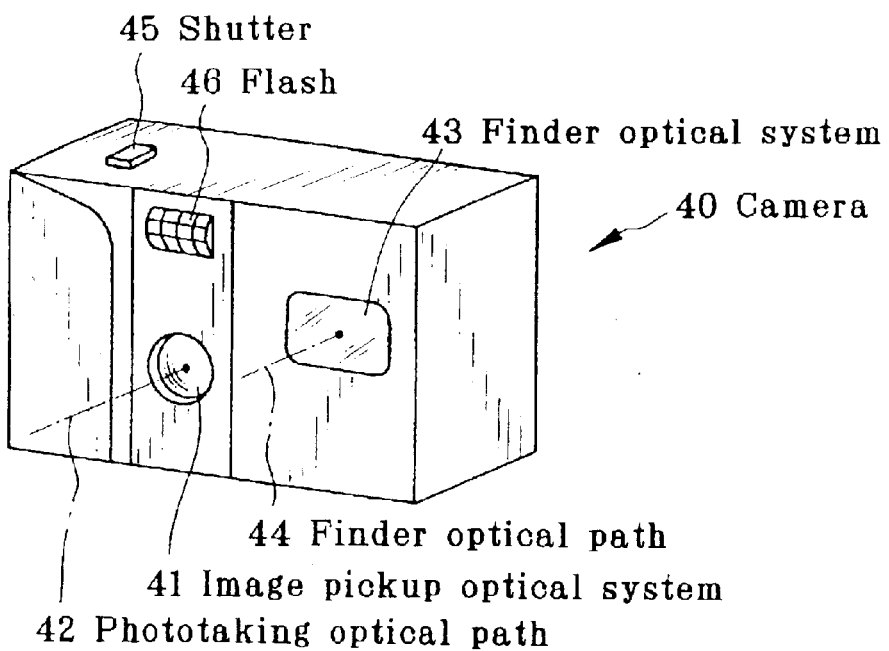
FIG. 11 is a front perspective schematic illustrative of the outside shape of a digital camera in which the optical path-bending zoom optical system of the present invention is built.
Figure 12:
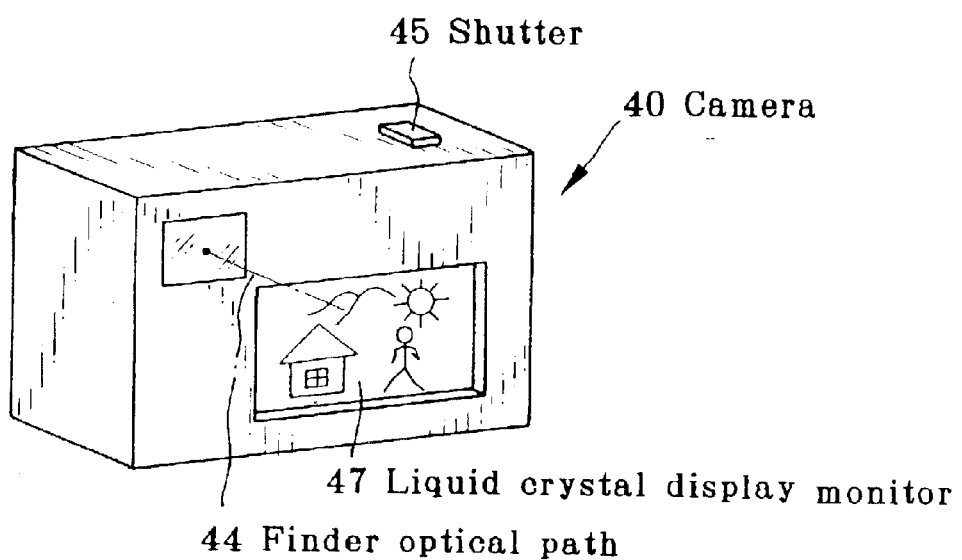
FIG. 12 is a rear perspective schematic of the digital camera of FIG. 11.
Figure 13:
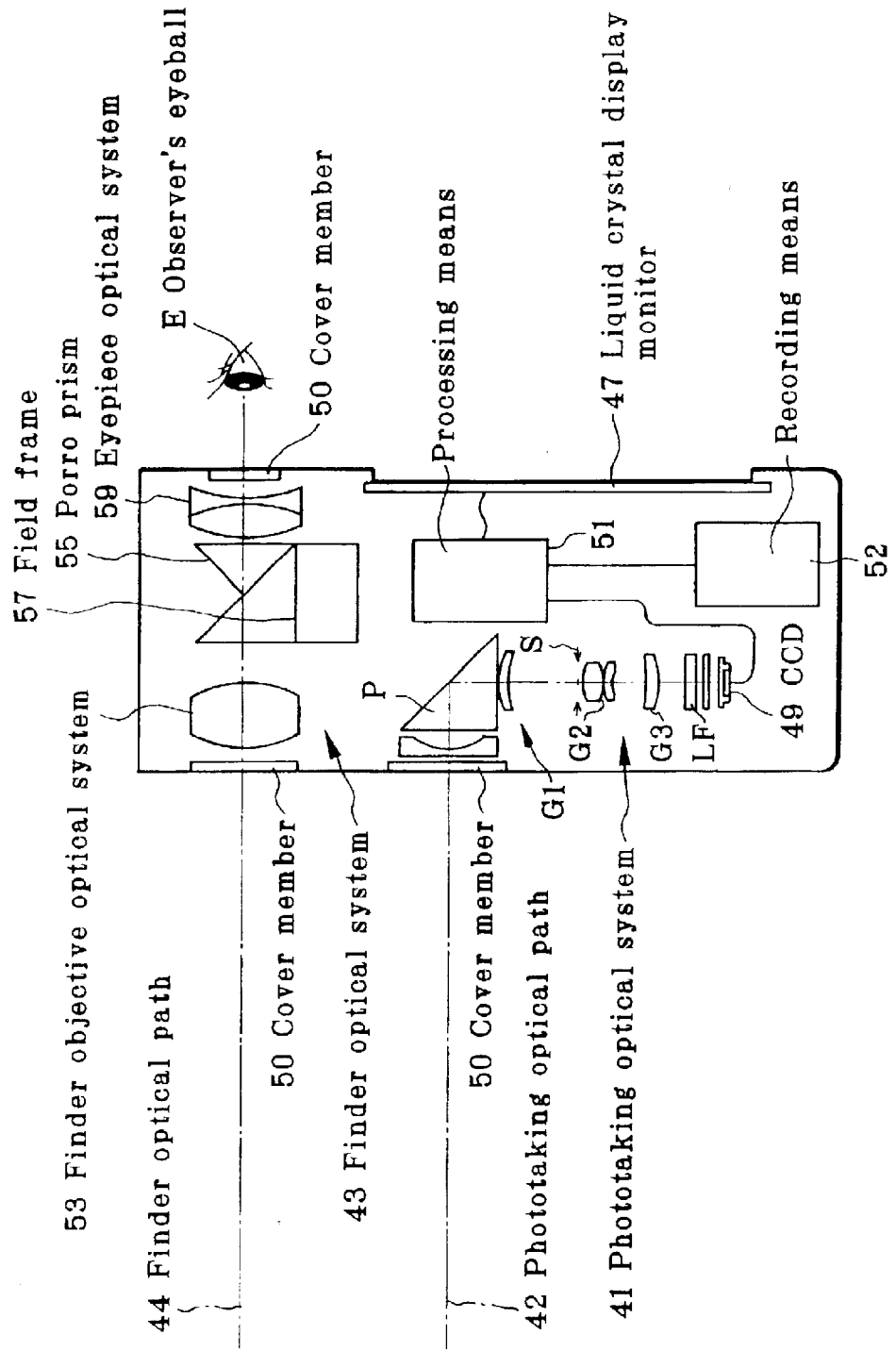
FIG. 13 is a sectional schematic of the digital camera of FIG. 11.

FIGS. 11, 12 and 13 are conceptual illustrations of a phototaking optical system 41 for digital cameras, in which the image-formation optical system of the present invention is built. FIG. 11 is a front perspective view of the outside shape of a digital camera 40, and FIG. 12 is a rear perspective view of the same. FIG. 13 is a sectional view of the construction of the digital camera 40. In this embodiment, the digital camera 40 comprises a phototaking optical system 41 including a phototaking optical path 42, a finder optical system 43 including a finder optical path 44, a shutter 45, a flash 46, a liquid crystal monitor 47 and so on. As the shutter 45 mounted on the upper portion of the camera 40 is pressed down, phototaking takes place through the phototaking optical system 41, for instance, the optical path-bending zoom lens according to Example 2. An object image formed by the phototaking optical system 41 is formed on the image pickup plane of a CCD 49 via a near-infrared cut filter and an optical low-pass filter LF. The object image received at CCD 49 is shown as an electronic image on the liquid crystal monitor 47 via processing means 51, which monitor is mounted on the back of the camera. This processing means 51 is connected with recording means 52 in which the phototaken electronic image may be recorded. It is here noted that the recording means 52 may be provided separately from the processing means 51 or, alternatively, it may be constructed in such a way that images are electronically recorded and written therein by means of floppy discs, memory cards, MOs or the like. This camera may also be constructed in the form of a silver halide camera using a silver halide film in place of CCD 49.

Moreover, a finder objective optical system 53 is located on the finder optical path 44. An object image formed by the finder objective optical system 53 is in turn formed on the field frame 57 of a Porro prism 55 that is an image-erecting member. In the rear of the Porro prism 55 there is located an eyepiece optical system 59 for guiding an erected image into the eyeball E of an observer. It is here noted that cover members 50 are provided on the entrance sides of the phototaking optical system 41 and finder objective optical system 53 as well as on the exit side of the eyepiece optical system 59.

With the thus constructed digital camera 40, it is possible to achieve high performance and cost reductions, because the phototaking optical system 41 is constructed of a zoom lens having a high zoom ratio at the wide-angle end with satisfactory aberrations and a back focus large enough to receive a filter, etc. therein.

In the embodiment of FIG. 13, plane-parallel plates are used as the cover members 50; however, it is acceptable to use powered lenses. Alternatively, those cover members may be dispensed with.

Figure 14:
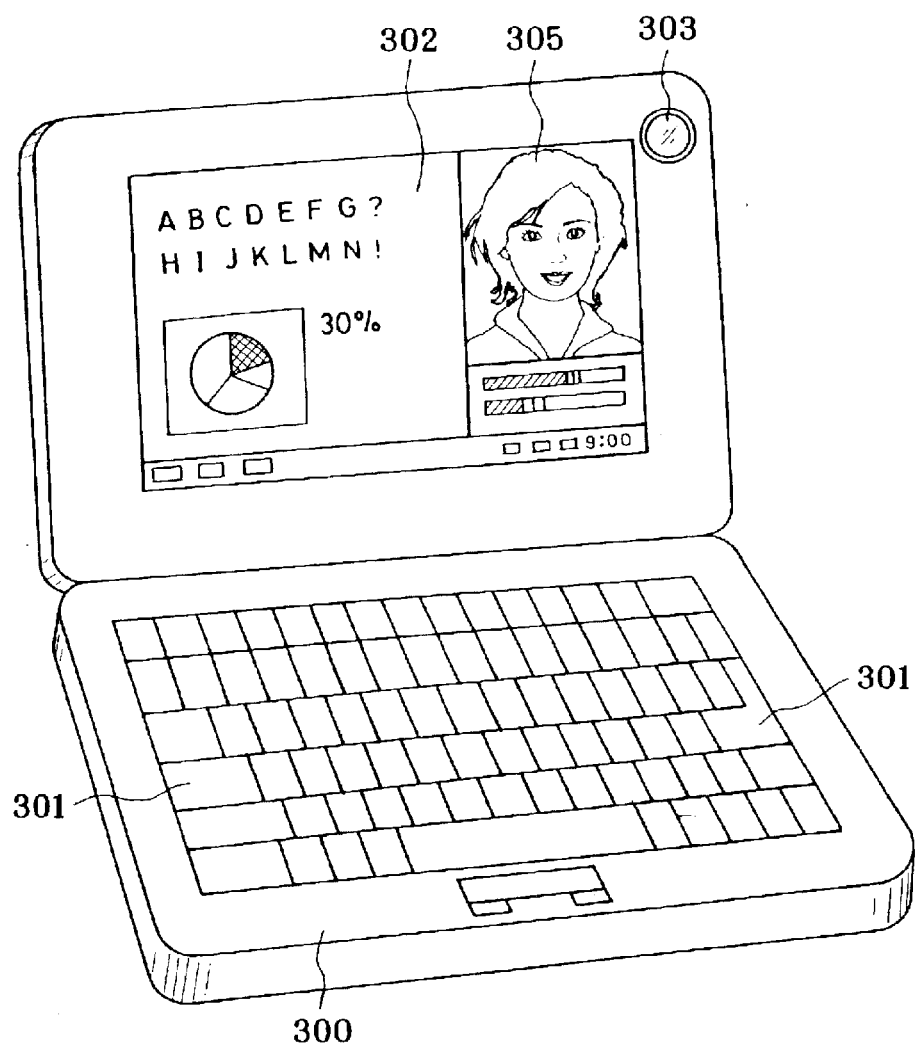
FIG. 14 is a front perspective view of an uncovered personal computer in which the optical path-bending zoom optical system of the present invention is built as an objective optical system.
Figure 15:
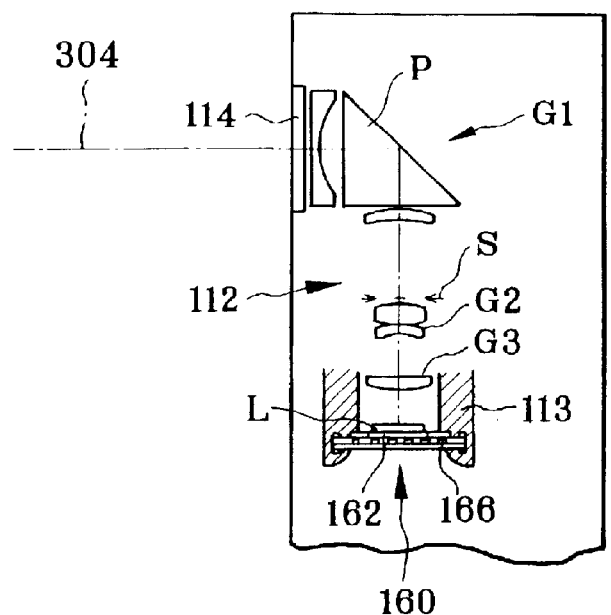
FIG. 15 is a sectional view of a phototaking optical system for a personal computer.
Figure 16:
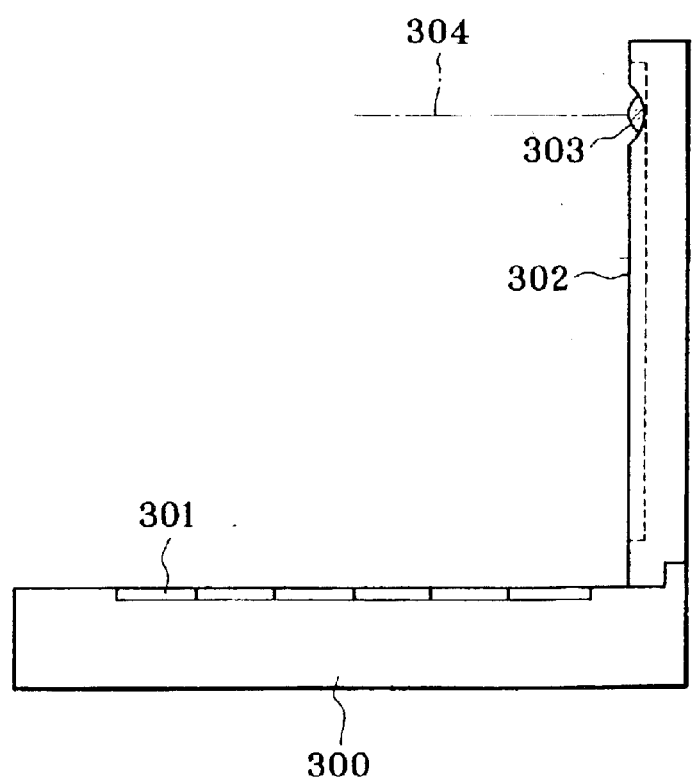
FIG. 16 is a side view of the state of FIG. 14.

FIGS. 14, 15 and 16 are illustrative of a personal computer that is one example of the information processor in which the image-formation optical system of the present invention is built as an objective optical system. FIG. 14 is a front perspective view of a personal computer 300 that is in an uncovered state, FIG. 15 is a sectional view of a phototaking optical system 303 in the personal computer 300, and FIG. 16 is a side view of the state of FIG. 14. As shown in FIGS. 14, 15 and 16, the personal computer 300 comprises a keyboard 301 via which an operator enters information therein from outside, information processing or recording means (not shown), a monitor 302 on which the information is shown for the operator, and a phototaking optical system 303 for taking an image of the operator and surrounding images. For the monitor 302, use may be made of a transmission type liquid crystal display device illuminated by backlight (not shown) from the back surface, a reflection type liquid crystal display device in which light from the front is reflected to show images, or a CRT display device. While the phototaking optical system 303 is shown as being built in the right upper portion of the monitor 302, it may be located somewhere around the monitor 302 or keyboard 301.

This phototaking optical system 303 comprises, on a phototaking optical path 304, an objective lens 112 such as one represented by Example 2 of the optical path-bending zoom lens according to the present invention and an image pickup device chip 162 for receiving an image. These are built in the personal computer 300.

Here an optical low-pass filter LF is additionally applied onto the image pickup device chip 162 to form an integral imaging unit 160, which can be fitted into the rear end of a lens barrel 113 of the objective lens 112 in one-touch operation. Thus, the assembly of the objective lens 112 and image pickup device chip 162 is facilitated because of no need of alignment or control of surface-to-surface spacing. The lens barrel 113 is provided at its end (not shown) with a cover glass 114 for protection of the objective lens 112. It is here noted that driving mechanisms for the zoom lens, etc. contained in the lens barrel 113 are not shown.

An object image received at the image pickup device chip 162 is entered via a terminal 166 in the processing means of the personal computer 300, and displayed as an electronic image on the monitor 302. As an example, an image 305 taken of the operator is shown in FIG. 14. This image 305 may be displayed on a personal computer on the other end via suitable processing means and the Internet or telephone line.

Figure 17A:
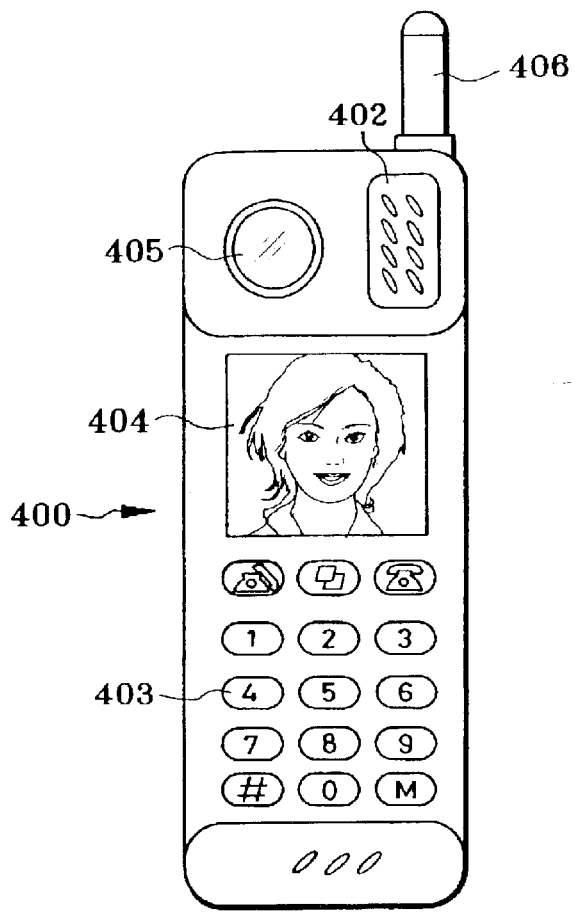
FIGS. 17(a) and 17(b) are a front and a side view of a cellular phone in which the optical path-bending zoom optical system of the present invention is built as an objective optical system.
Figure 17B:
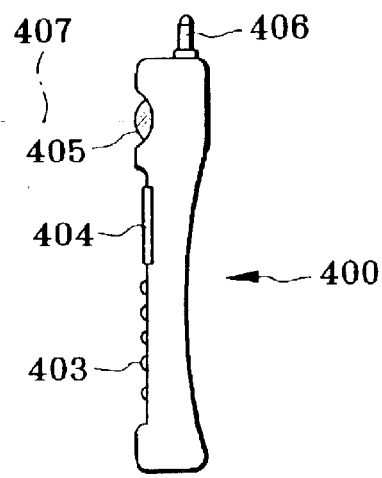
Figure 17C:
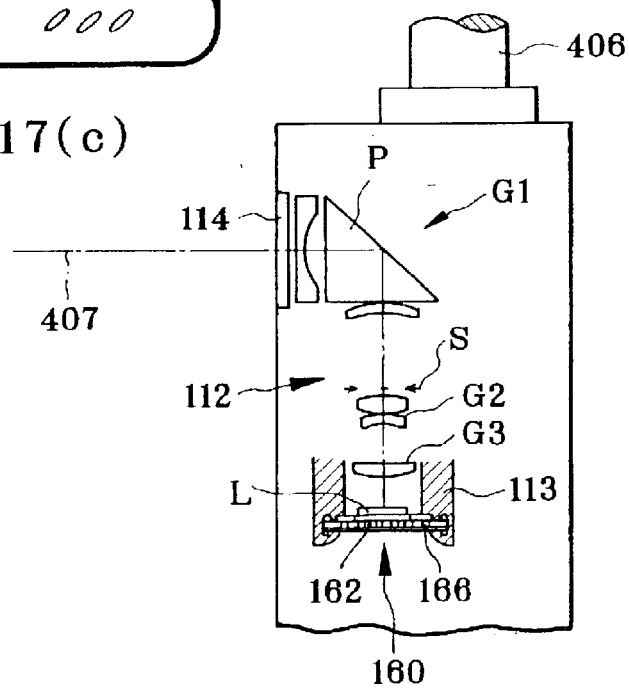
FIG. 17(c) is a sectional view of a phototaking optical system for the same.

FIGS. 17(a), 17(b) and 17(c) are illustrative of a telephone set that is one example of the information processor in which the image-formation optical system of the present invention is built in the form of a photo-taking optical system, especially a convenient-to-carry cellular phone. FIG. 17(a) and FIG. 17(b) are a front and a side view of a cellular phone 400, respectively, and FIG. 17(c) is a sectional view of a phototaking optical system 405. As shown in FIGS. 17(a), 17(b) and 17(c), the cellular phone 400 comprises a microphone 401 for entering the voice of an operator therein as information, a speaker 402 for producing the voice of the person on the other end, an input dial 403 via which the operator enters information therein, a monitor 404 for displaying an image taken of the operator or the person on the other end and indicating information such as telephone numbers, a photo-taking optical system 405, an antenna 406 for transmitting and receiving communication waves, and processing means (not shown) for processing image information, communication information, input signals, etc. Here the monitor 404 is a liquid crystal display device. It is noted that the components are not necessarily arranged as shown. The phototaking optical system 405 comprises, on a phototaking optical path 407, an objective lens 112 such as one represented by Example 1 of the optical path-bending zoom lens according to the present invention and an image pickup device chip 162 for receiving an object image. These are built in the cellular phone 400.

Here an optical low-pass filter LF is additionally applied onto the image pickup device chip 162 to form an integral imaging unit 160, which can be fitted into the rear end of a lens barrel 113 of the objective lens 112 in one-touch operation. Thus, the assembly of the objective lens 112 and image pickup device chip 162 is facilitated because of no need of alignment or control of surface-to-surface spacing. The lens barrel 113 is provided at its end (not shown) with a cover glass 114 for protection of the objective lens 112. It is here noted that driving mechanisms for the zoom lens, etc. contained in the lens barrel 113 are not shown.

An object image received at the image pickup device chip 162 is entered via a terminal 166 in processing means (not shown), so that the object image can be displayed as an electronic image on the monitor 404 and/or a monitor at the other end. The processing means also include a signal processing function for converting information about the object image received at the image pickup device chip 162 into transmittable signals, thereby sending the image to the person at the other end.

In the present invention as described above, the reflective optical element such as a mirror is inserted into the optical path (optical axis) through the zoom lens system to bend the optical path, with the addition of some contrivances thereto. It is thus possible to achieve a camera which comprises a reduced number of lens elements while keeping high optical specification performances such as a high zoom ratio, a wide-angle arrangement, a reduced F-number and limited

What we claim is:

1. A zoom lens, comprising a moving lens group B that has positive refracting power and moves only toward an object side of the zoom lens upon zooming from a wide-angle end to a telephoto end of the zoom lens, a lens group A that is located on the object side with respect to the moving lens group B, has negative refracting power and remains fixed during the zooming, and a third lens group C that is located on an image side of the zoom lens with respect to the moving lens group B and moves in a locus different from that of the moving lens group B during the zooming, wherein:

the lens group A that remains fixed during the zooming comprises, in order from an object side thereof, a negative lens element, a reflective optical element and a positive lens element having an absolute value of refracting power smaller than that of the negative lens element.

2. A zoom lens, comprising a moving lens group B that has positive refracting power and moves only toward an object side of the zoom lens upon zooming from a wide-angle end to a telephoto end of the zoom lens, a lens group A that is located on the object side with respect to the moving lens group B, has negative refracting power and remains fixed during the zooming, and a third lens group C that is located on an image side of the zoom lens with respect to the moving lens group B and moves in a locus different from that of the moving lens group B during the zooming, wherein:

the lens group A that remains fixed during the zooming comprises, in order from an object side thereof, a negative lens element, a reflective optical element and a plastic meniscus lens element having an aspheric surface.

3. The zoom lens according to claim 1, wherein the moving lens group B comprises a positive lens element having at least one aspheric surface and a negative lens element.

4. The zoom lens according to claim 1, wherein the third lens group C comprises one positive lens element.

5. The zoom lens according to claim 1, wherein the reflective optical element consists of a prism that satisfies the following condition (2):

$$1.5 < n_{PRI} \quad (2)$$

wherein $n_{PRI}$ is a d-line refractive index of a medium of the prism.

6. The zoom lens according to claim 1, wherein the lens group A that remains fixed during the zooming is located nearest to the abject side of the zoom lens.

7. The zoom lens according to claim 1, wherein a composite focal length from an entrance surface of the lens group A that remains fixed during the zooming to a lens surface thereof located just before the moving lens group B is negative.

8. The zoom lens according to claim 1, which satisfies the following conditions (3) and (4):

$$1.2 < -f_A/<2.4\sqrt{(f_W \cdot f_T)} < 2.4 \quad (3)$$

$$1.0 < -f_B/<2.4\sqrt{(f_W \cdot f_T)} < 1.8 \quad (4)$$

where $f_A$ is a focal length of the lens group A, $F_B$ is a focal length of the lens group B, $F_W$ is a focal length of the zoom lens at a wide-angle end thereof, and $f_T$ is a focal length of the zoom lens at a telephoto end thereof.

9. The zoom lens according to claim 8, which further satisfies the following condition (5):

$$0.4 < \log \gamma_B / \log \gamma < 1.1 \quad (5)$$

where $\gamma$ is $f_T/f_W$ provided that $f_T$ is the focal length of the zoom lens at the telephoto end and $f_W$ is the focal length of the zoom lens at the wide-angle end, and $\gamma_B$ is a magnification of the lens group B at the telephoto end/a magnification of the lens group B at the wide-angle end.

10. The zoom lens according to claim 1, wherein the lens group A that remains fixed during the zooming consists of an object side-lens component comprising the negative lens element, the reflective optical element and an image side-lens component comprising the positive lens element.

11. The zoom lens according to claim 2, wherein the lens group A that remains fixed during zooming consists of an object side-lens component comprising the negative lens element, the reflective optical element and an image side-lens component comprising the meniscus lens element.

12. The zoom lens according to claim 10, which further satisfies the following condition (6):

$$-0.3 < f_{11}/f_{12} < 0.1 \quad (6)$$

where $f_{11}$ is a focal length of the object side-lens component in the lens group A and $f_{12}$ is a focal length of the image side-lens component in the lens group A.

13. The zoom lens according to claim 1, which further satisfies the following condition (7):

$$0.5 < (R_{22F} + R_{22R})/(R_{22F} - R_{22R}) < 2.8 \quad (7)$$

where $R_{22F}$ is an axial radius of curvature of a surface of a lens component located nearest to an image side of the moving lens group B wherein the surface is located nearest to an object side of the lens component, and $R_{22R}$ is an axial radius of curvature of a surface of the lens component nearest to the image side of the moving lens group B wherein the surface is located nearest to the image side of the lens component, provided that the lens component means a single lens o a cemented lens wherein a lens that contacts air on an object side and an image side along an optical path is thought of as one unit.

14. The zoom lens according to claim 1, wherein the moving lens group B consists of two lens elements, an object side-lens element and an image side-lens element, and satisfies the following condition (8):

$$14 < v_{21} - v_{22} \quad (8)$$

where $v_{21}$ is a d-line based Abbe number of a medium of the object side-lens element in the moving lens group B, and $v_{22}$ is a d-line based Abbe number of a medium of the image side-lens element in the moving lens group B.

15. The zoom lens according to claim 1, which has a zoom ratio ranging from 1.8 to 5.0 inclusive.

16. The zoom lens according to claim 6, wherein a lens group having a lens action consists of, in order from an object side thereof, the lens group A that remains fixed during the zooming, the moving lens group B and the third lens group C, three groups in all.

17. An electronic imaging system, comprising a zoom lens and an electronic image pickup device located on an image side of the zoom lens, wherein the zoom lens comprises a moving lens group B that has positive refracting power and moves only toward an object side of the zoom lens upon zooming from a wide-angle end to a telephoto end of the zoom lens, a lens group A that is located on the object side with respect to the moving lens group B, has negative refracting power and remains fixed during the zooming, and a third lens group C that is located on an image side of the zoom lens with respect to the moving lens group B and moves in a locus different from that of the moving lens group B during the zooming, wherein the lens group A that remains fixed during the zooming comprises, in order from an object side thereof, a negative lens element, a reflective optical element and a positive lens element having an absolute value of refracting power smaller than that of the negative lens element.

18. An electronic imaging system, comprising a zoom lens and an electronic image pickup device located on an image side of the zoom lens, in which the zoom lens comprises a moving lens group B that has positive refracting power and moves only toward an object side of the zoom lens upon zooming from a wide-angle end to a telephoto end of the zoom lens, a lens group A that is located on the object side with respect to the moving lens group B, has negative refracting power and remains fixed during the zooming, and a third lens group C that is located on an image side of the zoom lens with respect to the moving lens group B and moves in a locus different from that of the moving lens group B during the zooming, wherein:

the lens group A that remains fixed during the zooming comprises, in order from an object side thereof, a negative lens element, a reflective optical element and a plastic meniscus lens element having an aspheric surface.

19. The electronic imaging system according to claim 17, wherein the lens group A that remains fixed during the zooming consists of an object side-lens component comprising the negative lens element, the reflective optical element and an image side-lens component comprising the positive lens element, and satisfies the following condition (1):

$$1.0 < d/L < 2.0 \tag{1}$$

where d is an optical path length, as calculated on an air basis, from a surface of an object side-lens component located on the object side of the zoom lens with respect to the reflective optical element in the lens group A wherein the surface is located nearest to an image side of the object side-lens component to a surface of an image side-lens component located on an image side of the zoom lens with respect to the reflective optical element in the lens group A wherein the surface is located nearest to an object side of the image side-lens component, and L is a diagonal length of an effective image pickup area of the electronic image pickup device.

20. The electronic imaging system according to claim 18, wherein the lens group A that remains fixed during the zooming consists of an object side-lens component comprising the negative lens element, the reflective optical element and an image side-lens component comprising the meniscus lens element, and satisfies the following condition (1):

$$1.0 < d/L < 2.0 \tag{1}$$

where d is an optical path length, as calculated on an air basis, from a surface of an object side-lens component located on the object side of the zoom lens with respect to the reflective optical element in the lens group A wherein the surface is located nearest to an image side of the object side-lens component to a surface of an image side-lens component located on an image side of the zoom lens with respect to the reflective optical element in the lens group A wherein the surface is located nearest to an object side of the image side-lens component, and L is a diagonal length of an effective image pickup area of the electronic image pickup device.

21. The electronic imaging system according to claim 17, wherein the zoom lens has an angle of view of 55° or greater at the wide-angle end.

22. The electronic imaging system according to claim 17, wherein the moving lens group B in the zoom lens consists of two lens components, an object side-lens component and an image side-lens component, and satisfies the following conditions (9) and (10):

$$-1.0 < (R_{21F}+R_{21R})/(R_{21F}-R_{21R}) < 0.4 \tag{9}$$

$$-2.0 < L/f_{22} < -0.2 \tag{10}$$

where $R_{21F}$ is an axial radius of curvature of a surface of the object side-lens component in the moving lens group B wherein the surface is located nearest to an object side of the object side-lens component, $R_{21R}$ is an axial radius of curvature of a surface of the object side-lens component in the moving lens group B wherein the surface is located nearest to an image side of the object side-lens component, L is a diagonal length of an effective image pickup area of the electronic image pickup device, and f22 is a focal length of the image side-lens component in the moving lens group B.

23. The electronic imaging system according to claim 17, which further satisfies the following condition (11):

$$0.0 < L/f_c < 0.8 \tag{11}$$

where $f_c$ is a focal length of the third lens group C, and L is a diagonal length of an effective image pickup area of the electronic image pickup device.

* * * * *